United States Patent
Lim et al.

(10) Patent No.: US 11,916,711 B2
(45) Date of Patent: Feb. 27, 2024

(54) METHOD AND DEVICE FOR CONFIGURING NGV FRAME FOR WIDEBAND TRANSMISSION IN WIRELESS LAN SYSTEM

(71) Applicant: LG ELECTRONICS INC., Seoul (KR)

(72) Inventors: Dongguk Lim, Seoul (KR); Eunsung Park, Seoul (KR); Insun Jang, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 435 days.

(21) Appl. No.: 17/279,014

(22) PCT Filed: Oct. 1, 2019

(86) PCT No.: PCT/KR2019/012825
§ 371 (c)(1),
(2) Date: Mar. 23, 2021

(87) PCT Pub. No.: WO2020/071733
PCT Pub. Date: Apr. 9, 2020

(65) Prior Publication Data
US 2022/0038317 A1    Feb. 3, 2022

(30) Foreign Application Priority Data

Oct. 1, 2018 (KR) .................. 10-2018-0117209
Nov. 5, 2018 (KR) .................. 10-2018-0134741
(Continued)

(51) Int. Cl.
*H04L 27/26* (2006.01)
*H04W 52/52* (2009.01)
*H04W 84/12* (2009.01)

(52) U.S. Cl.
CPC .... *H04L 27/2603* (2021.01); *H04L 27/26025* (2021.01); *H04W 52/52* (2013.01); *H04W 84/12* (2013.01)

(58) Field of Classification Search
None
See application file for complete search history.

(56) References Cited

U.S. PATENT DOCUMENTS

2015/0117433 A1    4/2015  Zhang et al.
2016/0081087 A1    3/2016  Kwon
(Continued)

FOREIGN PATENT DOCUMENTS

CN    106464709    2/2017
CN    106576033    4/2017
(Continued)

OTHER PUBLICATIONS

State Intellectual Property Office of the People's Republic of China Application Serial No. 201980067147.3, Notice of Allowance dated Apr. 25, 2023, 5 pages.
(Continued)

*Primary Examiner* — Suhail Khan
(74) *Attorney, Agent, or Firm* — LEE, HONG, DEGERMAN, KANG & WAIMEY

(57) ABSTRACT

A method and device for transmitting an NGV frame in a wireless LAN system is proposed. Specifically, a transmission device generates an NGV frame and transmits the NGV frame through a first band. The NGV frame includes an L-STF, an L-LTF, an L-SIG, an NGV-SIG, an NGV-STF, an NGV-LTF, and NGV-Data. The L-STF, the L-LTF, the L-SIG, and the NGV-SIG are duplicated in units of second bands and transmitted through the first band. The NGV-STF, the NGV-LTF, and the NGV-Data are transmitted through a
(Continued)

Variable durations per HE-LTF symbol

| 8μs | 8μs | 4μs | 4μs | 8μs | 8μs | | | | |
|---|---|---|---|---|---|---|---|---|---|
| L-STF | L-STF | L-SIG | RL-SIG | HE-SIG-A | HE-STF | HE-LTF | ... | HE-LTF | Data | PE | full band of the first band. The first band is a 20 MHz band, and a second band is a 10 MHz band.

15 Claims, 38 Drawing Sheets

(30) Foreign Application Priority Data

Jan. 10, 2019 (KR) .......................... 10-2019-0003529
Mar. 12, 2019 (KR) .......................... 10-2019-0028322

(56) References Cited

U.S. PATENT DOCUMENTS

2019/0123863 A1* 4/2019 Zhang .................. H04B 1/0064
2019/0280919 A1* 9/2019 Sadeghi .............. H04L 41/0803

FOREIGN PATENT DOCUMENTS

| EP | 3094036 | 11/2016 |
| EP | 3320624 | 5/2018 |
| JP | 2007208522 | 8/2007 |
| WO | 2017007931 | 1/2017 |
| WO | 2017031001 | 2/2017 |
| WO | 2017065543 | 4/2017 |

OTHER PUBLICATIONS

NEC, "Discussion on LAA frame structure," 3GPP TSG RAN WG1 Meeting #82, R1-154204, Aug. 2015, 2 pages.
European Patent Office Application Serial No. 19869399.6, Office Action dated Jun. 9, 2022, 8 pages.
Chu et al., "NGV MAC Discussions," IEEE 802.11-18/1249r0, Jul. 2018, 8 pages.
Kenney, "An Automaker Perspective on Next Gen V2X," IEEE 802.11-18/0917r0, May 2018, 19 pages.
European Patent Office Application Serial No. 19869399.6, Search Report dated Sep. 23, 2021, 12 pages.
Kiang et al., "Content of the extra tones in LSIG and RLSIG," IEEE 802.11-16/0046r0, Jan. 2016, 16 pages.
Im et al., "PPDU Format for 11bd," IEEE 802.11-19/739r3, May 2019, 20 pages.
Cao et al., "11bd Frame Format," IEEE 802.11-19/0342r0, Mar. 2019, 11 pages.
European Patent Office Application Serial No. 19869399.6, Notice of Allowance dated Jan. 10, 2023, 8 pages.
Cao et al., "Doppler Impact on OFDM Numerology for NGV," IEEE 802.11-18/1553r0, Sep. 2018, 11 pages.
PCT International Application No. PCT/KR2019/012825, International Search Report dated Jan. 13, 2020, 4 pages.

* cited by examiner

METHOD AND DEVICE FOR CONFIGURING NGV FRAME FOR WIDEBAND TRANSMISSION IN WIRELESS LAN SYSTEM

CROSS-REFERENCE TO RELATED APPLICATIONS

This application is the National Stage filing under 35 U.S.C. 371 of International Application No. PCT/KR2019/012825, filed on Oct. 1, 2019, which claims the benefit of earlier filing date and right of priority to KR Application Nos. 10-2018-0117209 filed on Oct. 1, 2018, 10-2018-0134741 filed on Nov. 5, 2018, 10-2019-0003529 filed on Jan. 10, 2019, and 10-2019-0028322 filed on Mar. 12, 2019, the contents of which are all incorporated by reference herein in their entireties.

BACKGROUND OF THE DISCLOSURE

Field of the Disclosure

This specification relates to a scheme for configuring an NGV frame in a wireless LAN system and, most particularly, to a method and device for configuring an NGV frame at a wide band so as to allow 802.11p and NGV to be interoperable in a wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE DISCLOSURE

Technical Objects

This specification proposes a method and device that are configured for transmitting an NGV frame at a wide band in a wireless LAN system.

Technical Solutions

An example of this specification proposes a method for transmitting an NGV frame.

This embodiment may be performed in a network environment being supported by a next generation wireless LAN system. The next generation wireless LAN system is an enhanced version of the 802.11p system, which can satisfy backward compatibility with the 802.11p system. The next generation wireless LAN system may also be referred to as a Next Generation V2X (NGV) wireless LAN system or an 802.11be wireless LAN system.

This embodiment is performed by a transmitting device, and the transmitting device may correspond to an AP. A receiving device of this embodiment may correspond to an NGV STA supporting an NGV or 802.11bd system or may correspond to an 11p STA supporting an 802.11p system.

This embodiment proposes a method for configuring an NGV frame for transmitting an NGV signal through a wide band (20 MHz or wider) while satisfying interoperability, backward compatibility or coexistence between/of the NGV or 802.11bd wireless LAN system and the 802.11p system, which is a legacy system.

The transmitting device generates the New Generation Vehicular (NGV) frame.

The transmitting device transmits the NGV frame through the first band.

The NGV frame includes Legacy-Short Training Field (L-STF), Legacy-Long Training Field (L-LTF), Legacy-Signal (L-SIG), Repeated Legacy (RL)-SIG, NGV-SIG, NGV-STF, NGV-LTF, and NGV-Data.

The L-STF, the L-LTF, the L-SIG, the RL-SIG, and the NGV-SIG are duplicated in units of a second band and transmitted through the first band. The first band is a 20 MHz band, and the second band is a 10 MHz band. That is, the L-STF, the L-LTF, the L-SIG, the RL-SIG, and the NGV-SIG may be configured in 10 MHz band (or channel) units, and, in order to be transmitted at a 20 MHz band, the frames (legacy part and NGV-SIG) being transmitted at a 10 MHz band may be duplicated once and then transmitted.

Conversely, the NGV-STF, the NGV-LTF, and the NGV-Data are transmitted through a full band of the first band. That is, the NGV-STF, the NGV-LTF, and the NGV-Data, which are remaining fields excluding the previously duplicated fields, may be transmitted by using all of the entire 20 MHz band (first band).

Effects of the Disclosure

According to the embodiment proposed in this specification, by configuring an NGV frame that is interoperable between 802.11p and NGV, and by eliminating interference between the 802.11p and the NGV and transmitting the NGV frame at a 20 MHz band, enhanced throughput and fast communication speed may be achieved.

DESCRIPTION OF EXEMPLARY EMBODIMENTS

Figure 1:
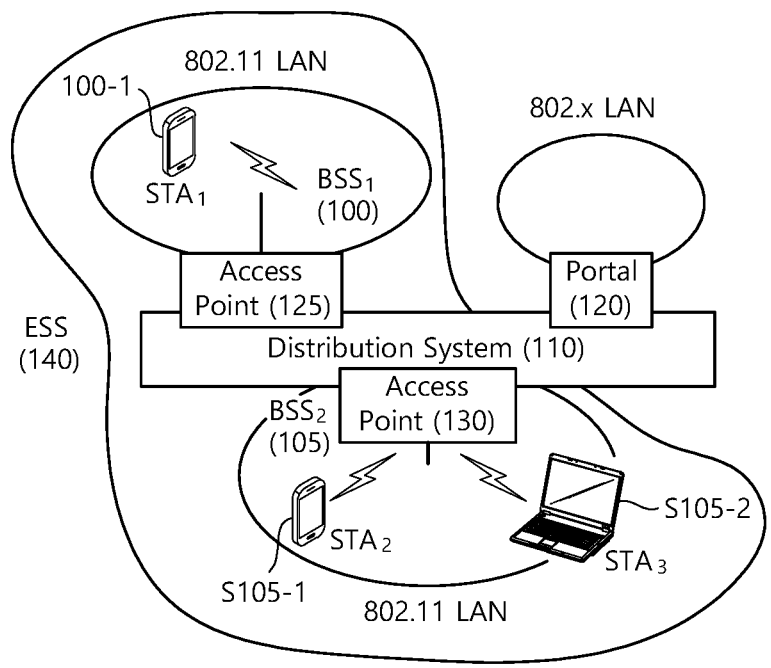
FIG. 1 is a conceptual view illustrating the structure of a wireless local area network (WLAN).
Figure 1:
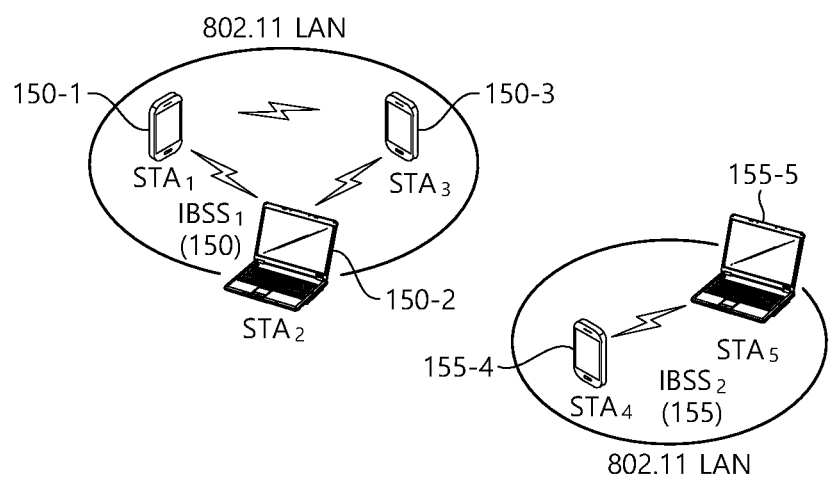

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs (100, 105) (hereinafter, referred to as BSS). The BSSs (100, 105), as a set of an AP and an STA such as an access point (AP) (125) and a station (STA1) (100-1) which are successfully synchronized to communicate with each other, are not concepts indicating a specific region. The BSS (105) may include one or more STAs (105-1, 105-2) which may be joined to one AP (130).

The BSS may include at least one STA, APs providing a distribution service, and a distribution system (DS) (110) connecting multiple APs.

The distribution system (110) may implement an extended service set (ESS) (140) extended by connecting the multiple BSSs (100, 105). The ESS (140) may be used as a term indicating one network configured by connecting one or more APs (125, 130) through the distribution system (110). The AP included in one ESS (140) may have the same service set identification (SSID).

A portal (120) may serve as a bridge which connects the wireless LAN network (IEEE 802.11) and another network (e.g., 802.X).

In the BSS illustrated in the upper part of FIG. 1, a network between the APs (125, 130) and a network between the APs (125, 130) and the STAs (100-1, 105-1, 105-2) may be implemented. However, the network is configured even between the STAs without the APs (125, 130) to perform communication. A network in which the communication is performed by configuring the network even between the STAs without the APs (125, 130) is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs (150-1, 150-2, 150-3, 155-4, 155-5) are managed by a distributed manner. In the IBSS, all STAs (150-1, 150-2, 150-3, 155-4, 155-5)

may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in various meanings, for example, in wireless LAN communication, this term may be used to signify a STA participating in uplink MU MIMO and/or uplink OFDMA transmission. However, the meaning of this term will not be limited only to this.

Figure 2:
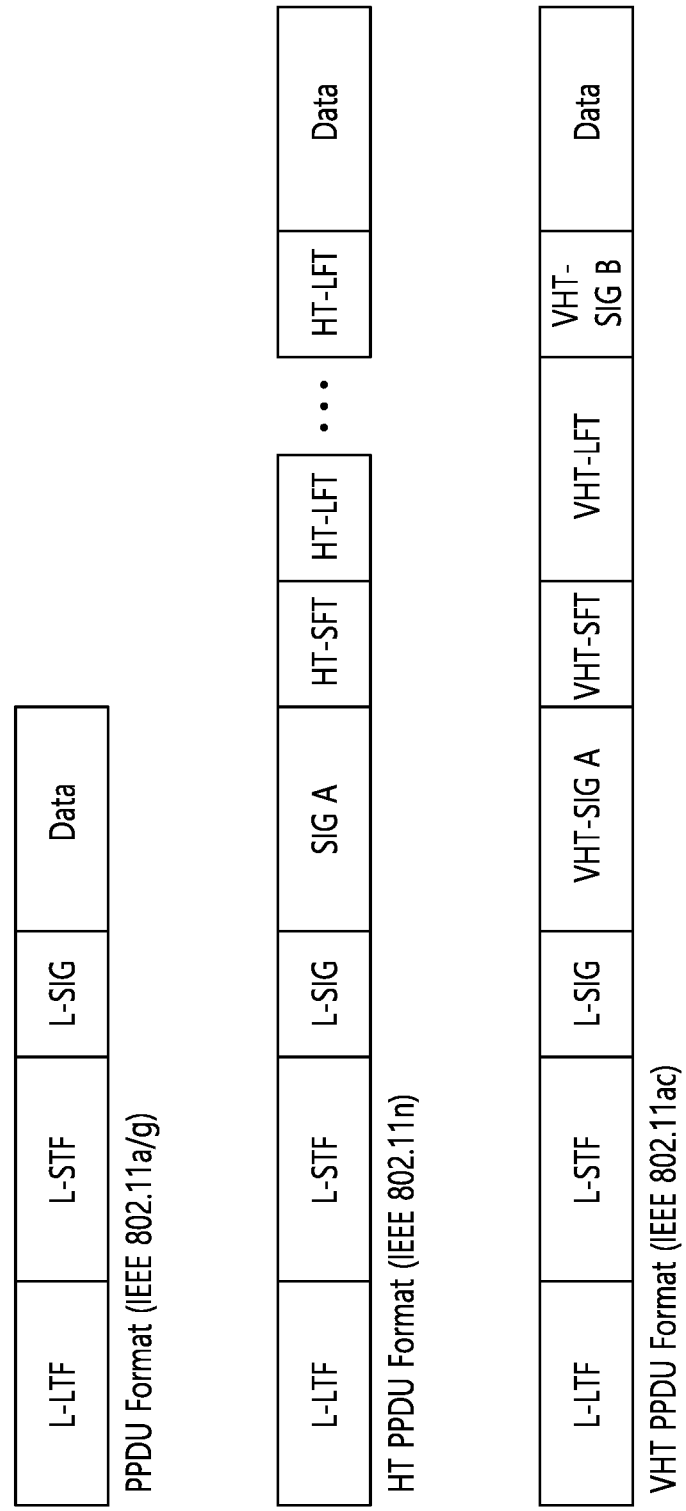
FIG. 2 is a diagram illustrating an example of a PPDU used in an IEEE standard.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, and so on. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
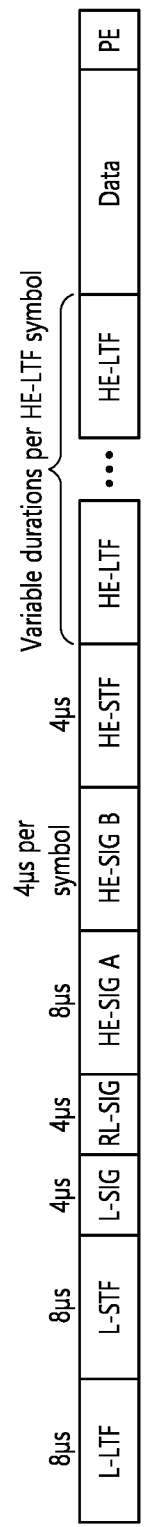
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIGA), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
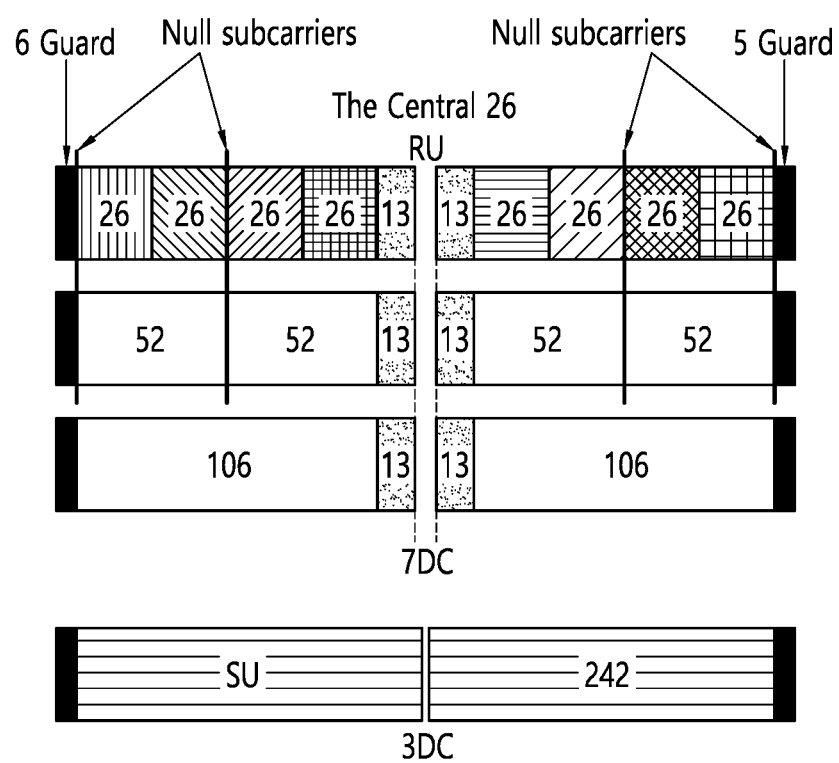
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and, in this case, as illustrated in a lowermost part of FIG. 4, one 242-unit may be used and, in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
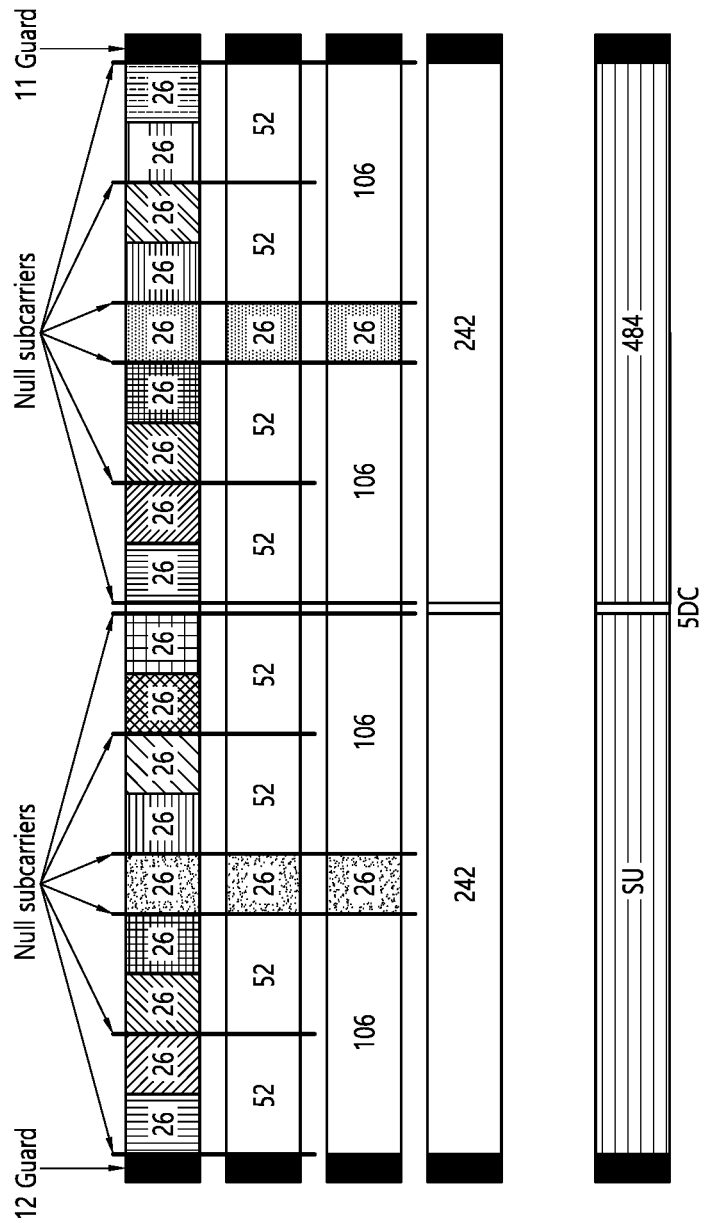
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like, may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
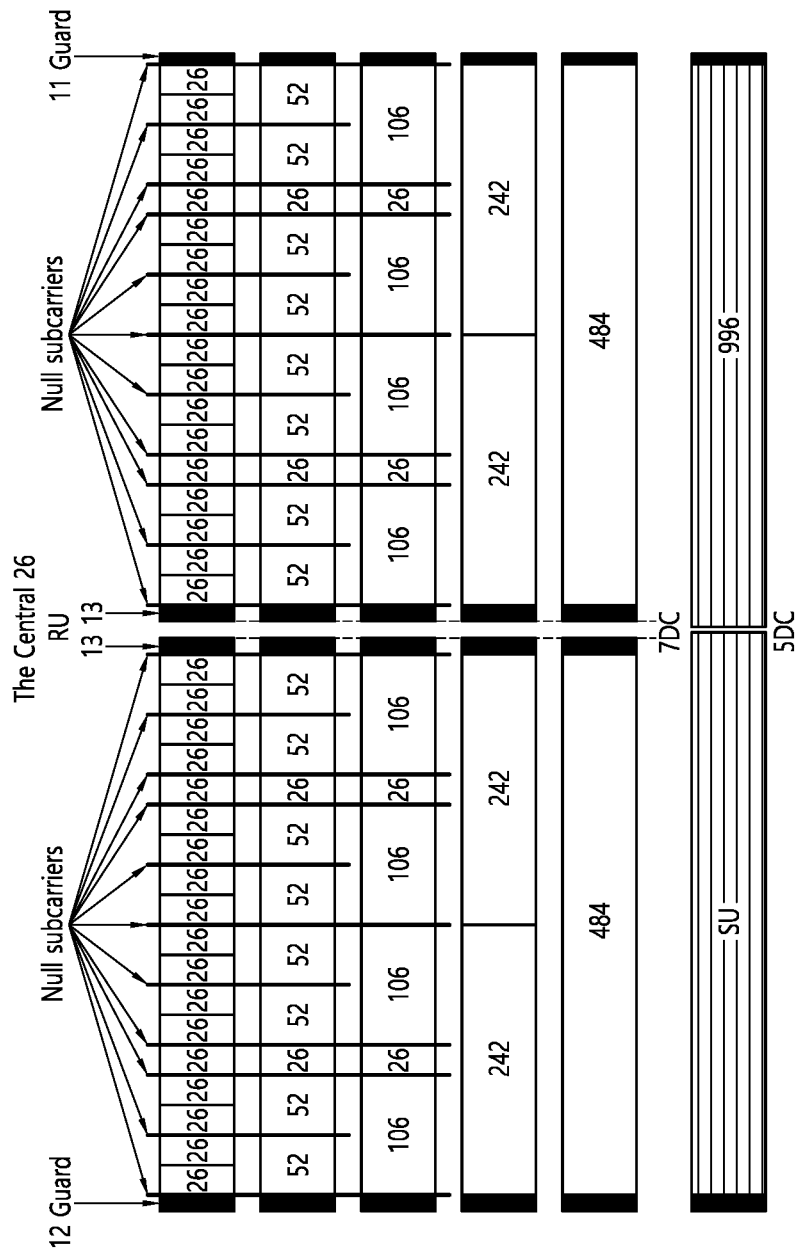
FIG. 6 is a diagram illustrating a layout of resource units (RUs) used in a band of 80 MHz.

FIG. 6 is a diagram illustrating a layout of resource units (RUs) used in a band of 80 MHz.

Figure 26:
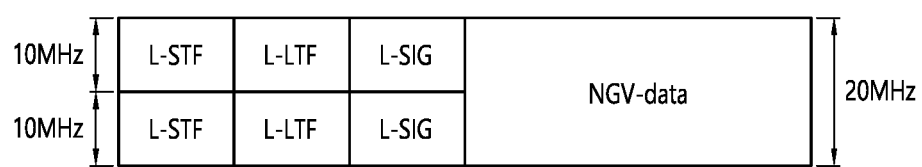
FIG. 26 shows an example of an NGV PPDU format being transmitted at a 20 MHz band and being configured only of an L-part and NGV-data.

Similarly to a case in which the RUs having various RUs are used in one example of each of FIG. 4 or 5, 26-RU, 52-RU, 106-RU, 242-RU, 484-RU, and the like, may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and, in this case, 5 DC tones may be inserted.

Meanwhile, the detailed number of RUs may be modified similarly to one example of each of FIG. 4 or FIG. 5.

Figure 7:
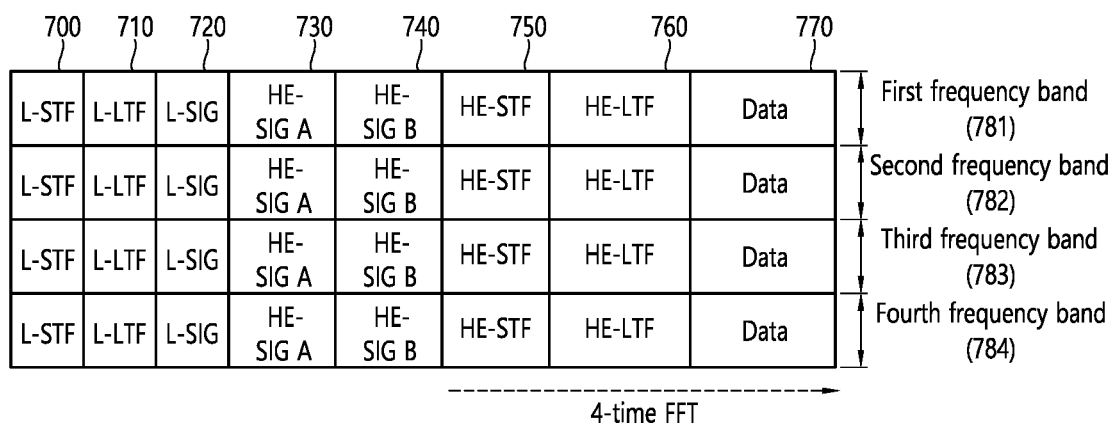
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF (700) may include a short training orthogonal frequency division multiplexing (OFDM) symbol. The L-STF (700) may be used for frame detection, automatic gain control (AGC), diversity detection, and coarse frequency/time synchronization.

An L-LTF (710) may include a long training orthogonal frequency division multiplexing (OFDM) symbol. The L-LTF (710) may be used for fine frequency/time synchronization and channel prediction.

An L-SIG (720) may be used for transmitting control information. The L-SIG (720) may include information regarding a data rate and a data length. Further, the L-SIG (720) may be repeatedly transmitted. That is, a new format, in which the L-SIG (720) is repeated (for example, may be referred to as R-LSIG) may be configured.

An HE-SIG-A (730) may include the control information common to the receiving station.

In detail, the HE-SIG-A (730) may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), and 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A (730) may be composed of two parts: HE-SIG-A1 and HE-SIG-A2. HE-SIG-A1 and HE-SIG-A2 included in the HE-SIG-A may be defined by the following format structure (fields) according to the PPDU. First, the HE-SIG-A field of the HE SU PPDU may be defined as follows.

TABLE 11

| Two Parts of HE-SIG-A | Bit | Field | Number of bits | Description |
| --- | --- | --- | --- | --- |
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0.(#16803) |
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |
| | B7 | DCM | 1 | Indicates whether or not DCM is applied to the Data field for the MCS indicated. If the STBC field is 0, then set to 1 to indicate that DCM is applied to the Data field. Neither DCM nor STBC shall be applied if(#15489) both the DCM and STBC are set to 1. Set to 0 to indicate that DCM is not applied to the Data field. NOTE-DCM is applied only to HE-MCSs 0, 1, 3 and 4. DCM is applied only to 1 and 2 spatial streams. DCM is not applied in combination with STBC(#15490). |
| | B8-B13 | BSS Color | 6 | The BSS Color field is an identifier of the BSS. Set to the value of the TXVECTOR parameter BSS_COLOR. |
| | B14 | Reserved | 1 | Reserved and set to 1 |
| | B15-B18 | Spatial Reuse | 4 | Indicates whether or not spatial reuse is allowed during the transmission of this PPDU(#16804). Set to a value from Table 28-21 (Spatial Reuse field encoding for an HE SU PPDU, HE ER SU PPDU, and HE MU PPDU), see 27.11.6 (SPATIAL_REUSE). |

TABLE 11-continued

| Two Parts of HE-SIG-A | Bit | Field | Number of bits | Description |
|---|---|---|---|---|
| | | | | Set to SRP_DISALLOW to prohibit SRP-based spatial reuse during this PPDU. Set to SRP_AND_NON_S-RG_OBSS_PD_PROHIBITED to prohibit both SRP-based spatial reuse and non-SRG OBSS PD-based spatial reuse during this PPDU. For the interpretation of other values see 27.11.6 (SPATIAL REUSE) and 27.9 Spatial reuse operation). |
| | B19-B20 | Bandwidth | 2 | For an HE SU PPDU:<br>Set to 0 for 20 MHz<br>Set to 1 for 40 MHz<br>Set to 2 for 80 MHz<br>Set to 3 for 160 MHz and 80 + 80 MHz<br>For an HE ER SU PPDU:<br>Set to 0 for 242-tone RU<br>Set to 1 for upper frequency 106-tone RU within the primary 20 MHz<br>Values 2 and 3 are reserved |
| | B21-B22 | GI + LTF Size | 2 | Indicates the GI duration and HE-LTF size.<br>Set to 0 to indicate a 1x HE-LTF and 0.8 as GI<br>Set to 1 to indicate a 2x HE-LTF and 0.8 as GI<br>Set to 2 to indicate a 2x HE-LTF and 1.6 as GI<br>Set to 3 to indicate:<br>a 4x HE-LTF and 0.8 μs GI if both the DCM and STBC fields are 1. Neither DCM nor STBC shall be applied if(#Ed) both the DCM and STBC fields are set to 1.<br>a 4x HE-LTF and 3.2 μs GI, otherwise |
| | B23-B25 | NSTS And Midamble Periodicity | 3 | If the Doppler field is 0, indicates the number of space-time streams.<br>Set to the number of space-time streams minus 1<br>For an HE ER SU PPDU, values 2 to 7 are reserved<br>If the Doppler field is 1; then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU) or HE-SIG-A3 (HE ER SU PPDU) | B0-B6 | TXOP | 7 | Set to 127 to indicate no duration information if (#15491) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)(#16277)<br>Otherwise, B0 is set to 1 and B1-B6 is set to floor((TXOP_DURATION - 512 ) / 128)(#16277).<br>where(#16061)<br>B0 indicates the TXOP length granularity. Set to 0 for 8 μs; otherwise set to 1 for 128 μs.<br>B1-B6 indicates the scaled value of the TXOP_DURATION |
| | B7 | Coding | 1 | Indicates whether BCC or LDPC is used:<br>Set to 0 to indicate BCC<br>Set to 1 to indicate LDPC |
| | B8 | LDPC Extra Symbol Segment | 1 | Indicates the presence of the extra OFDM symbol segment for LDPC:<br>Set to 1 if an extra OFDM symbol segment for LDPC is present<br>Set to 0 if an extra OFDM symbol segment for LDPC is not present<br>Reserved and set to 1 if the Coding field is set to 0(#15492). |
| | B9 | STBC | 1 | If the DCM field is set to 0, then set to 1 if space time block coding is used. Neither DCM nor STBC shall be applied if(#15493) both the DCM field and STBC field are set to 1.<br>Set to 0 otherwise. |
| | B10 | Beamformed(# 16038) | 1 | Set to 1 if a beamforming steering matrix is applied to the waveform in an SU transmission.<br>Set to 0 otherwise. |

TABLE 11-continued

| Two Parts of HE-SIG-A | Bit | Field | Number of bits | Description |
|---|---|---|---|---|
| | B11-B12 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity(#16274) as defined in 28.3.12 (Packet extension). |
| | B14 | Reserved | 1 | Reserved and set to 1 |
| | B15 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE MU PPDU may be defined as follows.

TABLE 2

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TXVECTOR parameter UPLINK_FLAG.(#16805)<br>NOTE—The TDLS peer can identify the TDLS frame by To DS and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |
| | B4 | SIGB DCM | 1 | Set to 1 indicates that the HE-SIG-B is modulated with DCM for the MCS.<br>Set to 0 indicates that the HE-SIG-B is not modulated with DCM for the MCS.<br>NOTE—DCM is only applicable to MCS 0, MCS 1, MCS 3, and MCS 4. |
| | B5-B10 | BSS Color | 6 | The BSS Color field is an identifier of the BSS.<br>Set to the value of the TXVECTOR parameter BSS_COLOR. |
| | B11-B14 | Spatial Reuse | 4 | Indicates whether or not spatial reuse is allowed during the transmission of this PPDU(#16806).<br>Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)).<br>Set to SRP_DISALLOW to prohibit SRP-based spatial reuse during this PPDU. Set to SRP_AND_NON_SRG_OBSS_PD_PROIBBITED to prohibit both SRP-based spatial reuse and non-SRG OBSS PD-based spatial reuse during this PPDU.<br>For the interpretation of other values see 27.11.6 (SPATIAL_REUSE) and 27.9 (Spatial reuse operation). |

TABLE 2-continued

| Two Parts of HE-SIG-A | Bit | Field | Number of bits | Description |
|---|---|---|---|---|
| | B15-B17 | Bandwidth | 3 | Set to 0 for 20 MHz.<br>Set to 1 for 40 MHz.<br>Set to 2 for 80 MHz non-preamble puncturing mode.<br>Set to 3 for 160 MHz and 80 + 80 MHz non-preamble puncturing mode.<br>If the SIGB Compression field is 0:<br>  Set to 4 for preamble puncturing in 80 MHz, where in the preamble only the secondary 20 MHz is punctured.<br>  Set to 5 for preamble puncturing in 80 MHz, where in the preamble only one of the two 20 MHz sub-channels in secondary 40 MHz is punctured.<br>  Set to 6 for preamble puncturing in 160 MHz or 80 + 80 MHz, where in the primary 80 MHz of the preamble only the secondary 20 MHz is punctured.<br>  Set to 7 for preamble puncturing in 160 MHz or 80 + 80 MHz, where in the primary 80 MHz of the preamble the primary 40 MHz is present.<br>If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field:(#15494)<br>Set to the number of OFDM symbols in the HE-SIG-B field minus 1 if the number of OFDM symbols in the HE-SIG-B field is less than 16;<br>Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0;<br>Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case.<br>If the HE-SIG-B Compression field is set to 1, indicates the number of MU-MIMO users and is set to the number of NU-MIMO users minus 1(#15495). |
| | B22 | SIGB Compression | 1 | Set to 0 if the Common field in HE-SIG-B is present.<br>Set to 1 if the Common field in HE-SIG-B is not present. (#16139) |
| | B23-B24 | GI + LTF Size | 2 | Indicates the GI duration and HE-LTF size:<br>  Set to 0 to indicate a 4 × HE-LTF and 0.8 µs GI<br>  Set to 1 indicate a 2 × HE-LTF and 0.8 µs GI<br>  Set to 2 to indicate a 2 × HE-LTF and 1.6 µs GI<br>  Set to 3 to indicate a 4 × HE-LTF and 3.2 µs GI |
| | B25 | Doppler | 1 | Set to 1 if one of the following applies:<br>  —The number of OFDM symbols in the Data field is larger than the signaled midamble periodicity plus 1 and the midamble is present<br>  —The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| HE-SIG-A2 | B0-B6 | TXOP | 7 | Set to 127 to indicate no duration in information if (#15496) TXVECTOR parameter TXOP_DURATION is set to UNSPECIFIED.<br>Set to a value less than 127 to indicate duration information for NAV setting and protection of the TXOP as follows:<br>  If TXVECTOR parameter TXOP_DURATION is less than 512, then B0 is set to 0 and B1-B6 is set to floor(TXOP_DURATION/8)(#16277).<br>  Otherwise, B0 is set to 1 and B1-B6 is set to floor ((TXOP_DURATION − 512)/128)(#16277). |

TABLE 2-continued

| Two Parts of HE-SIG-A | Bit | Field | Number of bits | Description |
|---|---|---|---|---|
| | | | | where(#16061)<br>B0 indicates the TXOP length granularity. Set to 0 for 8 μs; otherwise set to 1 for 128 μs.<br>B1-B6 indicates the scaled value of the TXOP_DURATION |
| | B7 | Reserved | 1 | Reserved and set to 1 |
| | B8-B10 | Number of HE-LTF Symbols And Midamble Periodicity | 3 | If the Doppler field is set to 0(#15407) indicates the number of HE-LTF symbols:<br>Set to 0 for 1 HE-LTF symbol<br>Set to 1 for 2 HE-LTF symbols<br>Set to 2 for 4 HE-LTF symbols<br>Set to 3 for 6 HE-LTF symbols<br>Set to 4 for 8 HE-LTF symbols<br>Other values are reserved.<br>If the Doppler field is set to 1(#15498), B8-B9 indicates the number of HE-LTF symbols(#16056) and B10 indicates midamble periodicity:<br>B8-B9 is encoded as follows:<br>0 indicates 1 HE-LTF symbol<br>1 indicates 2 HE-LTF symbols<br>2 indicates 4 HE-LTF symbols<br>3 is reserved<br>B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC.<br>Set to 1 if an extra OFDM symbol segment for LDPC is present.<br>Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload.<br>STBC does not apply to HE-SIG-B.<br>SBC is not applied if one or more RUs are used for MU-MIMO allocation. (#15401) |
| | B13-B14 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B15 | PE Disambiguity | 1 | Indicates PE disambiguity(#16274) as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU:<br>Set to 0 for an HE TB PPDU |
| | B1-B6 | BSS Color | 6 | The BSS Color field is an identifier of the BSS.<br>Set to the value of the TXVECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz, or 80 MHz then this Spatial Reuse field applies to the first 20 MHz subband. |

TABLE 3-continued

| Two Parts of HE-SIG-A | Bit | Field | Number of bits | Description |
|---|---|---|---|---|
| | | | | If the Bandwidth field indicates 160/80 + 80 MHz then this Spatial Reuse field applies to the first 40 MHz subband of the 160 MHz operating band. Set to the value of the SPATIAL REUSE(1) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz:   This Spatial Reuse field applies to the second 20 MHz subband.   If(#Ed) the STA operating channel width is 20 MHz, then this field is set to the same value as Spatial Reuse 1 field.   If(#Ed) the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of the 160 MHz operating band. Set to the value of the SPATIAL_REUSE(2) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz:   This Spatial Reuse field applies to the third 20 MHz subband.   If(#Ed) the STA operating channel width is 20 MHz or 40 MHz, this field is set to the same value as Spatial Reuse 1 field. If the Bandwidth field indicates 160/80 + 80 MHz:   This Spatial Reuse field applies to the third 40 MHz subband of the 160 MHz operating band.   If(#Ed) the STA operating channel width is 80 + 80 MHz, this field is set to the same value as Spatial Reuse 1 field. Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 3-continued

| Two Parts of HE-SIG-A | Bit | Field | Number of bits | Description |
|---|---|---|---|---|
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz or 80 MHz:<br>  This Spatial Reuse field applies to the fourth 20 MHz subband.<br>  If(#Ed) the STA operating channel width is 20 MHz, then this field is set to the same value as Spatial Reuse 1 field.<br>  If(#Ed) the STA operating channel width is 40 MHz, then this field is set to the mine value as Spatial Reuse 2 field.<br>If the Bandwidth field indicates 160/80 + 80 MHz:<br>  This Spatial Reuse field applies to the fourth 40 MHz subband of the 160 MHz operating band.<br>  If(#Ed) the STA operating channel width is 80 + 80 MHz, then this field is set to same value as Spatial Reuse 2 field.<br>Set to the value of the SPATIAL REUSE(4) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROBIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1.<br>NOTE—Unlike other Reserved fields in HE-SIG-A of the HE TB PPDU, B23 does not have a corresponding bit in the Trigger frame. |
| | B24-B25 | Bandwidth | 2 | (#16003)Set to 0 for 20 MHz<br>Set to 1 for 40 MHz<br>Set to 2 for 80 MHz<br>Set to 3 for 160 MHz and 80 + 80 MHz |
| HE-SIG-A2 | B0-B6 | TXOP | 7 | Set to 127 to indicate no duration information if(#15499) TXVECTOR parameter TXOP_DURATION is set to UNSPECIFIED.<br>Set to a value less than 127 to indicate duration information for NAV setting and protection of the TXOP as follows:<br>  If TXVECTOR parameter TXOP_DURATION is less than 512, then B0 is set to 0 and B1-B6 is set to floor(TXOP_DURATION/8)(#16277).<br>  Otherwise, B0 is set to 1 and B1-B6 is set to floor((TXOP_DURATION − 512)/128)(#16277).<br>where(#16061)<br>  B0 indicates the TXOP length granularity. Set to 0 for 8 μs; otherwise set to 1 for 128 μs.<br>  B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

An HE-SIG-B (740) may be included only in the case of the PPDU for the multiple users (MUs) as described above. Principally, an HE-SIG-A (750) or an HE-SIG-B (760) may include resource allocation information (alternatively, virtual resource allocation information) for at least one receiving STA.

Figure 8:
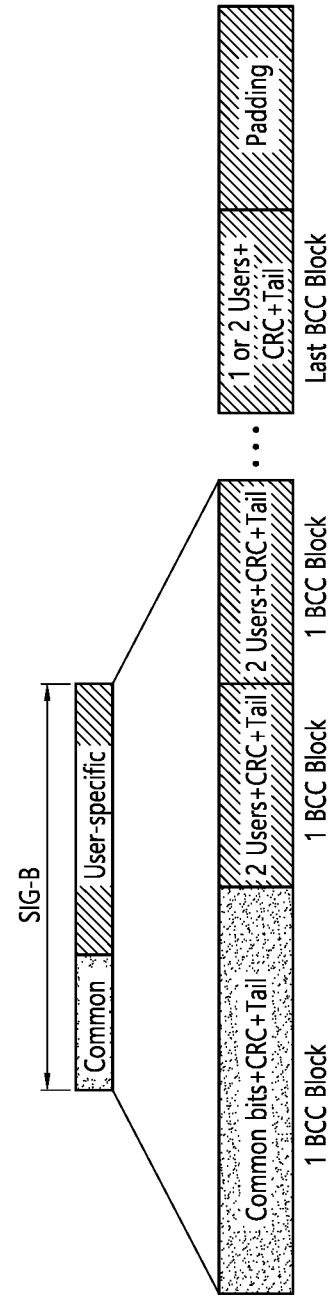
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B (740) may be transmitted in a duplicated form on a MU PPDU. In the case of the HE-SIG-B (740), the HE-SIG-B (740) transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B (740) in a specific frequency band (e.g., the second frequency band) is duplicated with the HE-SIG-B (740) of another frequency band (e.g., the fourth frequency band). Alternatively, the HE-SIG B (740) may be transmitted in an encoded form on all transmission resources. A field after the HE-SIG B (740) may include individual information for respective receiving STAs receiving the PPDU.

The HE-STF (750) may be used for improving automatic gain control estimation in a multiple input multiple output (MIMO) environment or an OFDMA environment.

The HE-LTF (760) may be used for estimating a channel in the MIMO environment or the OFDMA environment.

The size of fast Fourier transform (FFT)/inverse fast Fourier transform (IFFT) applied to the HE-STF (750) and the field after the HE-STF (750), and the size of the FFT/IFFT applied to the field before the HE-STF (750) may be different from each other. For example, the size of the FFT/IFFT applied to the HE-STF (750) and the field after the HE-STF (750) may be four times larger than the size of the FFT/IFFT applied to the field before the HE-STF (750).

For example, when at least one field of the L-STF (700), the L-LTF (710), the L-SIG (720), the HE-SIG-A (730), and the HE-SIG-B (740) on the PPDU of FIG. 7 is referred to as a first field, at least one of the data field (770), the HE-STF (750), and the HE-LTF (760) may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 µs and the IDFT/DFT length applied to each symbol of the second field of the HE PPDU may be expressed as 3.2 µs*4 (=12.8 µs). The length of the OFDM symbol may be a value acquired by adding the length of a guard interval (GI) to the IDFT/DFT length. The length of the GI may have various values such as 0.4 µs, 0.8 µs, 1.6 µs, 2.4 µs, and 3.2 µs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A (730) and may be instructed to receive the downlink PPDU based on the HE-SIG-A (730). In this case, the STA may perform decoding based on the FFT size changed from the HE-STF (750) and the field after the HE-STF (750). On the contrary, when the STA may not be instructed to receive the downlink PPDU based on the HE-SIG-A (730), the STA may stop the decoding and configure a network allocation vector (NAV). A cyclic prefix (CP) of the HE-STF (750) may have a larger size than the CP of another field and the during the CP period, the STA may perform the decoding for the downlink PPDU by changing the FFT size.

Hereinafter, in the embodiment of the present disclosure, data (alternatively, or a frame) which the AP transmits to the STA may be expressed as a term called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, subchannels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, subchannel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, subchannels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, subchannel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
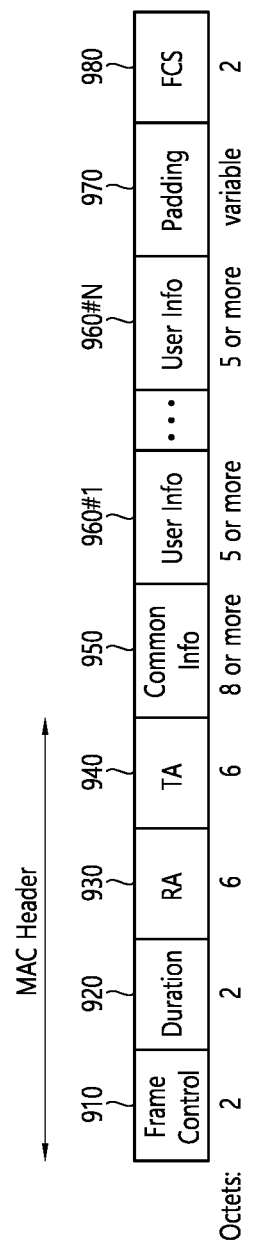
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field (910) shown in FIG. 9 may include information related to a version of the MAC protocol and other additional control information, and a Duration field (920) may include time information for configuring a NAV or information related to an identifier (e.g., AID) of the user equipment.

Also, the RA field (930) includes address information of a receiving STA of the corresponding trigger frame and may be omitted if necessary. The TA field (940) includes address information of an STA triggering the corresponding trigger frame (for example, an AP), and the common information field (950) includes common control information applied to a receiving STA that receives the corresponding trigger frame. For example, a field indicating the length of the L-SIG field of the UL PPDU transmitted in response to the corresponding trigger frame or information controlling the content of the SIG-A field (namely, the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960#1 to 960#N) corresponding to the number of receiving STAs that receive the trigger frame of FIG. 9. The per user information field may be referred to as an "RU allocation field".

Also, the trigger frame of FIG. 9 may include a padding field (970) and a frame check sequence field (980).

It is preferable that each of the per user information fields (960#1 to 960#N) shown in FIG. 9 includes a plurality of subfields.

Figure 10:
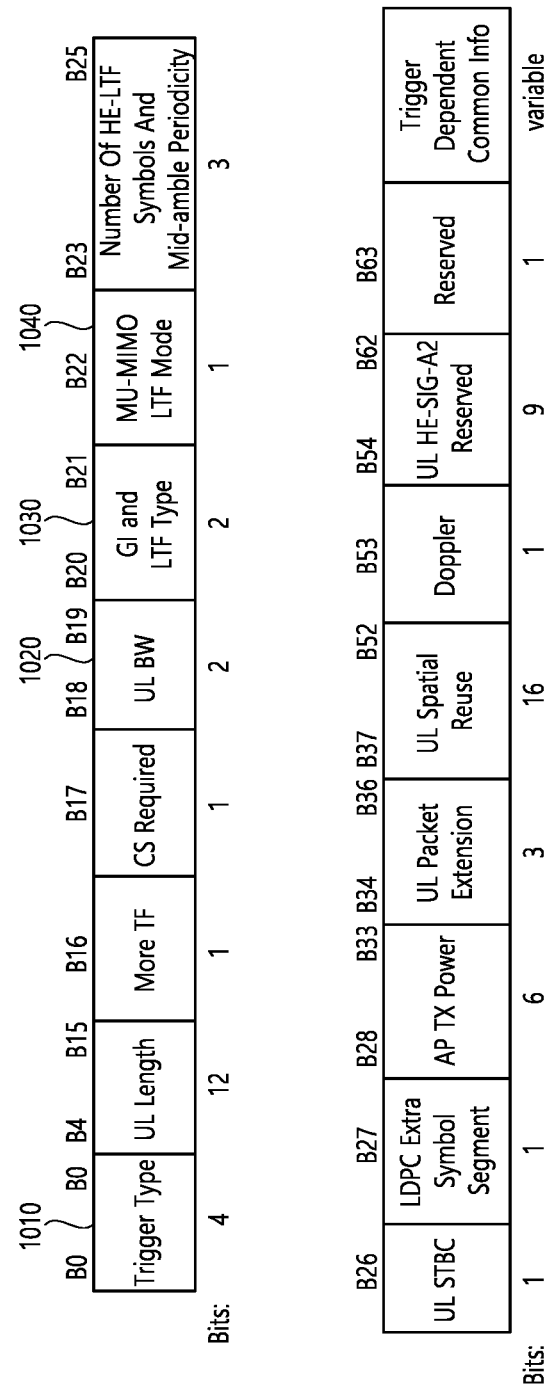
FIG. 10 illustrates an example of a common information field.

FIG. 10 illustrates an example of a common information field. Among the subfields of FIG. 10, some may be omitted, and other additional subfields may also be added. Additionally, the length of each of the subfields shown in the drawing may be varied.

The trigger type field (1010) of FIG. 10 may indicate a trigger frame variant and encoding of the trigger frame variant. The trigger type field (1010) may be defined as follows.

TABLE 4

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field (1020) of FIG. 10 indicates bandwidth in the HE-SIG-A field of an HE Trigger Based (TB) PPDU. The UL BW field (1020) may be defined as follows.

TABLE 5

| UL BW subfield value | Description |
|---|---|
| 0 | 20 MHz |
| 1 | 40 MHz |
| 2 | 80 MHz |
| 3 | 80 + 80 MHz or 160 MHz |

The Guard Interval (GI) and LTF type fields (1030) of FIG. 10 indicate the GI and HE-LTF type of the HE TB PPDU response. The GI and LTF type field (1030) may be defined as follows.

TABLE 6

| GI And LTF field value | Description |
|---|---|
| 0 | 1 × HE-LTF + 1.6 μs GI |
| 1 | 2 × HE-LTF + 1.6 μs GI |
| 2 | 4 × HE-LTF + 3.2 μs GI (#15968) |
| 3 | Reserved |

Also, when the GI and LTF type fields (1030) have a value of 2 or 3, the MU-MIMO LTF mode field (1040) of FIG. 10 indicates the LTF mode of a UL MU-MIMO HE TB PPDU response. At this time, the MU-MIMO LTF mode field (1040) may be defined as follows.

If the trigger frame allocates an RU that occupies the whole HE TB PPDU bandwidth and the RU is allocated to one or more STAs, the MU-MIMO LTF mode field (1040) indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field (1040) indicates the HE single stream pilot HE-LTF mode. The MU-MIMO LTF mode field (1040) may be defined as follows.

TABLE 7

| MU-MIMO LTF subfield value | Description |
|---|---|
| 0 | HE single stream pilot HE-LTF mode |
| 1 | HE masked HE-LTF sequence mode |

Figure 11:
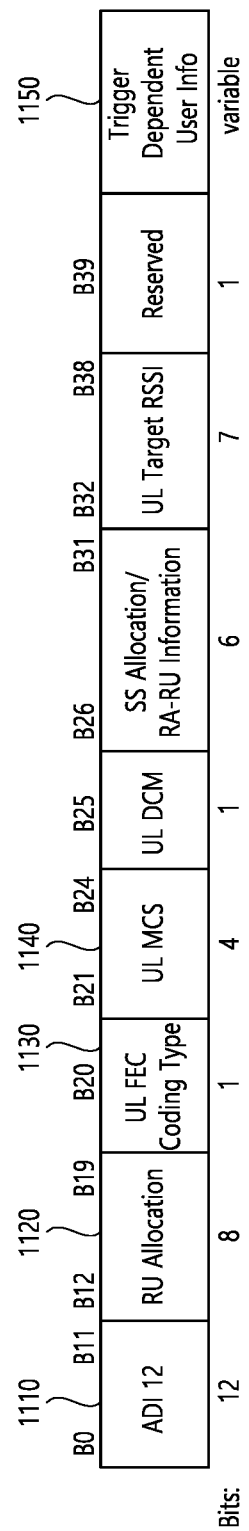
FIG. 11 illustrates an example of a sub-field being included in a per user information field.

FIG. 11 illustrates an example of a subfield being included in a per user information field. Among the subfields of FIG. 11, some may be omitted, and other additional subfields may also be added. Additionally, the length of each of the subfields shown in the drawing may be varied.

The User Identifier field of FIG. 11 (or AID12 field, 1110) indicates the identifier of an STA (namely, a receiving STA) corresponding to per user information, where an example of the identifier may be the whole or part of the AID.

Also, an RU Allocation field (1120) may be included. In other words, when a receiving STA identified by the User Identifier field (1110) transmits a UL PPDU in response to the trigger frame of FIG. 9, the corresponding UL PPDU is transmitted through an RU indicated by the RU Allocation field (1120). In this case, it is preferable that the RU indicated by the RU Allocation field (1120) indicates the RUs shown in FIGS. 4, 5, and 6. A specific structure of the RU Allocation field (1120) will be described later.

The subfield of FIG. 11 may include a (UL FEC) coding type field (1130). The coding type field (1130) may indicate the coding type of an uplink PPDU transmitted in response to the trigger frame of FIG. 9. For example, when BCC coding is applied to the uplink PPDU, the coding type field (1130) may be set to '1', and when LDPC coding is applied, the coding type field (1130) may be set to '0'.

Additionally, the subfield of FIG. 11 may include a UL MCS field (1140). The MCS field (1140) may indicate an MCS scheme being applied to the uplink PPDU that is transmitted in response to the trigger frame of FIG. 9.

Also, the subfield of FIG. 11 may include a Trigger Dependent User Info field (1150). When the Trigger Type field (1010) of FIG. 10 indicates a basic trigger variant, the Trigger Dependent User Info field (1150) may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for demodulate the data field of the PPDU. The first and second control fields may be used for various fields. For example, the first control field may be the HE-SIG-A (730) of FIG. 7, and the second control field may be the HE-SIG-B (740) shown in FIGS. 7 and 8.

Hereinafter, a specific example of improving the first or the second control field will be described.

In the following example, a control identifier inserted to the first control field or a second control field is proposed. The size of the control identifier may vary, which, for example, may be implemented with 1-bit information.

The control identifier (for example, a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (namely, 20 MHz). Accordingly, the control identifier (for example, 1-bit identifier) may indicate whether a single RU corresponding to the full bandwidth of the transmission frequency band is allocated.

For example, if the transmission frequency band has a bandwidth of 40 MHz, the control identifier (for example, a 1-bit identifier) may indicate whether a single RU corresponding to the full bandwidth (namely, bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (for example, a 1-bit identifier) may indicate whether a single RU corresponding to the full bandwidth (namely, bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (for example, 1-bit identifier).

First of all, when a single RU corresponding to the full bandwidth of the transmission frequency band is allocated through the control identifier (for example, a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (for example, spatial multiplexing) may be used to multiplex the signals for multiple users in the same, single RU. Accordingly, the control identifier (for example, a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields). The format of the common field may be defined as follows.

TABLE 8

| Subfield | Number of bits | Description |
| --- | --- | --- |
| RU Allocation | N × 8 | Indicates the RU assignment to be used in the data portion in the frequency domain. It also indicates the number of users in each RU. For RUs of size greater than or equal to 106-tones that support MU-MIMO, it indicates the number of users multiplexed using MU-MIMO.<br>Consists of N RU Allocation subfields:<br>　N = 1 for a 20 MHz and a 40 MHz HE MU PPDU<br>　N = 2 for an 80 MHz HE MU PPDU<br>　N = 4 for a 160 MHz or 80 + 80 MHz HE MU PPDU |
| Center 26-tone RU | 1 | This field is present only if(#15510) the value of the Bandwidth field of HE-SIG-A field in an HE MU PPDU is set to greater than 1.<br>If the Bandwidth field of the HE-SIG-A field in an HE MU PPDU is set to 2, 4 or 5 for 80 MHz:<br>　Set to 1 to indicate that a user is allocated to the center 26-tone RU (see Figure 28-7 (RU locations in an 80 MHz HE PPDU(#16528))); otherwise, set to 0. The same value is applied to both HE-SIG-B content channels. |

TABLE 8-continued

| Subfield | Number of bits | Description |
|---|---|---|
| | | If the Bandwidth field of the HE-SIG-A field in an HE MU PPDU is set to 3, 6 or 7 for 160 MHz or 80 + 80 MHz: For HE-SIG-B content channel 1, set to 1 to indicate that a user is allocated to the center 26-tone RU of the lower frequency 80 MHz; otherwise, set to 0. For HE-SIG-B content channel 2, set to 1 to indicate that a user is allocated to the center 26-tone RU of the higher frequency 80 MHz otherwise, set to 0. |
| CRC | 4 | See 28.3.10.7.3 (CRC computation) |
| Tail | 6 | Used to terminate the trellis of the convolutional decoder. Set to 0 |

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain. The mapping between an 8-bit RU allocation subfield for RU allocation and the number of users per RU may be defined as follows.

TABLE 9

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | 26 | 26 | | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | 26 | 26 | | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | 26 | 26 | | 1 |
| 00001111 | 52 | | 52 | | 26 | 52 | | 52 | | 1 |
| 00010$y_2y_1y_0$ | 52 | | 52 | | — | | 106 | | | 8 |
| 00011$y_2y_1y_0$ | | 106 | | | — | 52 | | 52 | | 8 |
| 00100$y_2y_1y_0$ | 26 | 26 | 26 | 26 | 26 | | 106 | | | 8 |
| 00101$y_2y_1y_0$ | 26 | 26 | | 52 | 26 | | 106 | | | 8 |
| 00110$y_2y_1y_0$ | | 52 | 26 | 26 | 26 | | 106 | | | 8 |
| 00111$y_2y_1y_0$ | | 52 | | 52 | 26 | | 106 | | | 8 |
| 01000y$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |
| 01010$y_2y_1y_0$ | | 106 | | | 26 | 52 | 26 | 26 | | 8 |
| 01011$y_2y_1y_0$ | | 106 | | | 26 | 52 | | 52 | | 8 |
| 0110$y_1y_0z_1z_0$ | | 106 | | | — | | 106 | | — | 16 |
| 01110000 | | 52 | | 52 | | 52 | | 52 | | 1 |
| 01110001 | | | | | 242-tone RU empty | | | | | 1 |
| 01110010 | | | | | 484-tone RU with zero User fields indicated in this RU Allocation subfield of the HE-SIG-B content channel | | | | | 1 |
| 01110011 | | | | | 996-tone RU with zero User fields indicated in this RU Allocation subfield of the HE-SIG-B content channel | | | | | 1 |
| 011101$x_1x_0$ | | | | | Reserved | | | | | 4 |
| 01111$y_2y_1y_0$ | | | | | Reserved | | | | | 8 |
| 10$y_2y_1y_0z_2z_1z_0$ | | | 106 | | 26 | | 106 | | | 64 |
| 11000$y_2y_1y_0$ | | | | | 242 | | | | | 8 |
| 11001$y_2y_1y_0$ | | | | | 484 | | | | | 8 |

TABLE 9-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 11010$y_2y_1y_0$ | | | | | 996 | | | | | 8 |
| 11011$y_2y_1y_0$ | | | | | Reserved | | | | | 8 |
| 111$x_4x_3x_2x_1x_0$ | | | | | Reserved | | | | | 32 |

If(#Ed) signaling RUs of size greater than 242 subcaniers, $y_2y_1y_0$ = 000-111 indicates number of User fields in the HE-SIG-B content channel that contains the corresponding 8-bit RU Allocation subfield. Otherwise, $y_2y_1y_0$ = 000-111 indicates number of STAs multiplexed in the 106-tone RU, 242-tone RU or the lower frequency 106-tone RU if there are two 106-tone RUs and one 26-tone RU is assigned between two 106-tone RUs. The binary vector $y_2y_1y_0$ indicates $2^2 \times y_2 + 2^1 \times y_1 + y_0 + 1$ STAs multiplexed the RU. $z_2z_1z_0$ = 000-111 indicates number of STAs multiplexed in the higher frequency 106-tone RU if there are two 106-tone RUs and one 26-tone RU is assigned between two 106-tone RUs. The binary vector $z_2z_1z_0$ indicates $2^2 \times z_2 + 2^1 \times z_1 + z_0 + 1$ STAs multiplexed in the RU.
Similarly, $y_1y_0$ = 00-11 indicates number of STAs multiplexed in the lower frequency 106-tone RU. The binary vector $y_1y_0$ indicates $2^1 \times y_1 + y_0 + 1$ STAs multiplexed in the RU.
Similarly, $z_1z_0$ = 00-11 indicates the number of STAs multiplexed in the higher frequency 106-tone RU. The binary vector zizo indicates $2^1 \times z_1 + z_0 + 1$ STAs multiplexed in the RU.
1 to #9 (from left to the right) is ordered in increasing order of the absolute frequency. $x_1x_0$ = 00-11, $x_4x_3x_2x_1x_0$ = 00000-11111.
'—' means no STA in that RU.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field fonnat for a non-MU-MIMO allocation is defined in Table 28-26 (User field format for a non-MU-MIMO allocation). The User field format for a MU-MIMO allocation is defined in Table 28-27 (User field for an MU-MIMO allocation). N = 1 if it is the last User Block field, and if there is only one user in the last iJser Block field. N = 2 otherwise. |
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is composed of a plurality of user fields. The plurality of user fields are located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only in one user field.

As an example, it may be assumed that the RU allocation subfield is configured with 8 bits of 01000010 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

User fields included in the user-specific field of the HE-SIG-B may be defined as described below. Firstly, user fields for non-MU-MIMO allocation are as described below.

TABLE 12

| Bit | Subfield | Number of bits | Description |
|---|---|---|---|
| B0-B10 | STA-ID | 11 | Set to a value of the element indicated from TXVECTOR parameter STA_ID_LIST (see 27.11.1 (STA_ID_LIST)). |
| B11-B13 | NSTS | 3 | Number of space-time streams. Set to the number of space-time streams minus 1. |
| B14 | Beam-formed(#16038) | 1 | Use of transmit beamfonning. Set to 1 if a beamforming steering matrix is applied to the waveform in an SU transmission. Set to 0 otherwise. |
| B15-B18 | MCS | 4 | Modulation and coding scheme Set to n for MCSn, where n = 0, 1, 2 . . . , 11 Values 12 to 15 are reserved |

TABLE 12-continued

| Bit | Subfield | Number of bits | Description |
|---|---|---|---|
| B19 | DCM | 1 | Indicates whether or not DCM is used.<br>Set to 1 to indicate that the payload(#Ed) of the corresponding user of the HE MU PPDU is modulated with DCM for the MCS.<br>Set to 0 to indicate that the payload of the corresponding user of the PPDU is not modulated with DCM for the MCS.<br>NOTE DCM is not applied in combination with STBC.(#15664) |
| B20 | Coding | 1 | Indicates whether BCC or LDPC is used.<br>Set to 0 for BCC<br>Set to 1 for LDPC |

NOTE—
If the STA-ID subfield is set to 2046, then the other subfields can be set to arbitrary values.(#15946)

User fields for MU-MIMO allocation are as described below.

TABLE 13

| Bit | Subfield | Number of bits | Description |
|---|---|---|---|
| B0-B10 | STA-ID | 11 | Set to a value of element indicated from TXVECTOR parameter STA_ID_LIST (see 27.11.1 (STA_ID_LIST)). |
| B11-B14 | Spatial Configuration | 4 | Indicates the number of spatial streams for a STA in an MU-MIMO allocation (see Table 28-28 (Spatial Configuration subfield encoding)). |
| B15-B18 | MCS | 4 | Modulation and coding scheme.<br>Set to n for MCSn, where n = 0, 1, 2, . . . , 11<br>Values 12 to 15 are reserved |
| B19 | Reserved | 1 | Reserved and set to 0 |
| B20 | Coding | 1 | Indicates whether BCC or LDPC is used.<br>Set to 0 for BCC<br>Set to 1 for LDPC |

NOTE—
If the STA-ID subfield is set to 2046, then the other subfields can be set to arbitrary values.(#15946)

Figure 12:
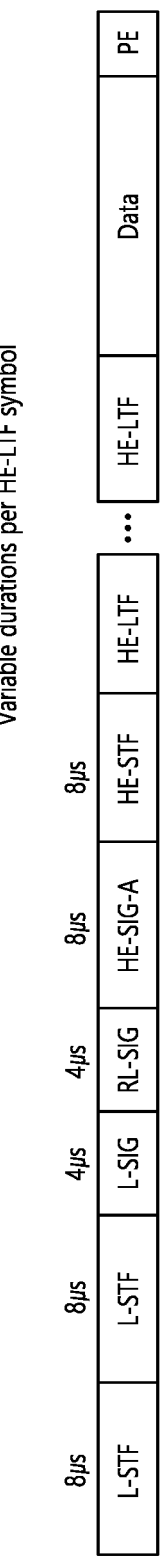
FIG. 12 illustrates one example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit a HE TB PPDU simultaneously with another STA which has received the trigger frame.

As shown in the figure, the PPDU of FIG. 12 includes various fields, each of which corresponds to the field shown in FIGS. 2, 3, and 7. Meanwhile, as shown in the figure, the HE TB PPDU (or uplink PPDU) of FIG. 12 may not include the HE-SIG-B field but only the HE-SIG-A field.

1. Carrier Sense Multiple Access/Collision Avoidance (CSMA/CA)

In IEEE 802.11, communication is achieved in a shared wireless medium, and thus has a characteristic fundamentally different from a wired channel environment. For example, communication is possible based on carrier sense multiple access/collision detection (CSMA/CD) in the wired channel environment. For example, when a signal is transmitted one time in Tx, the signal is transmitted to Rx without significant signal attenuation since a channel environment does not change much. In this case, when a collision occurs in two or more signals, it is detectable. This is because power detected in Rx is instantaneously greater than power transmitted in Tx. However, in a wireless channel environment, a channel is affected by various factors (e.g., a signal may be significantly attenuated according to a distance or may instantaneously experience deep fading), carrier sensing cannot be achieved correctly in Tx as to whether a signal is properly transmitted in Rx in practice or whether a collision exists. Therefore, a distributed coordination function (DCF) which is a carrier sense multiple access/collision avoidance (CSMA/CA) mechanism is introduced in 802.11. Herein, stations (STAs) having data to be transmitted perform clear channel assessment (CCA) for sensing a medium during a specific duration (e.g., DCF inter-frame space (DIFS)) before transmitting the data. In this case, if the medium is idle, the STA can transmit the data by using the medium. On the other hand, if the medium is busy, under the assumption that several STAs have already waited for the use of the medium, the data can be transmitted after waiting by a random backoff period in addition to the DIFS. In this case, the random backoff period can allow the collision to be avoidable because, under the assumption that there are several STAs for transmitting data, each STA has a different backoff interval probabilistically and thus eventually has a different transmission time. When one STA starts transmission, the other STAs cannot use the medium.

The random backoff time and the procedure will be simply described as follows. When a specific medium transitions from busy to idle, several STAs start a preparation for data transmission. In this case, to minimize a collision, the STAs intending to transmit the data select respective random backoff counts and wait by those slot times. The random backoff count is a pseudo-random integer value, and one of uniform distribution values is selected in the range of [0 CW]. Herein, CW denotes a contention window. A CW parameter takes a CWmin value as an initial value, and when transmission fails, the value is doubled. For example, if an ACK response is not received in response to a transmitted data frame, it may be regarded that a collision occurs. If the CW value has a CWmax value, the CWmax value is maintained until data transmission is successful, and when the data transmission is successful, is reset to the CWmin value. In this case, the values CW, CWmin, and CWmax are preferably maintained to $2^n-1$ for convenience of implementations and operations. Meanwhile, if the random backoff procedure starts, the STA selects the random backoff count in the [0 CW] range and thereafter continuously monitors a medium while counting down a backoff slot. In the meantime, if the medium enters a busy state, the countdown is stopped, and when the medium returns to an idle state, the countdown of the remaining backoff slots is resumed.

2. PHY Procedure

A PHY transmit/receive procedure in Wi-Fi is as follows, but a specific packet configuration method may differ. For convenience, only 11n and 11ax will be taken for example, but 11g/ac also conforms to a similar procedure.

That is, in the PHY transmit procedure, a MAC protocol data unit (MPDU) or an aggregate MPDU (A-MPDU) transmitted from a MAC end is converted into a single PHY service data unit (PSDU) in a PHY end, and is transmitted by inserting a preamble, tail bits, and padding bits (optional), and this is called a PPDU.

The PHY receive procedure is usually as follows. When performing energy detection and preamble detection (L/HT/VHT/HE-preamble detection for each Wi-Fi version), information on a PSDU configuration is obtained from a PHY header (L/HT/VHT/HE-SIG) to read a MAC header, and then data is read.

3. MAC Header

Figure 13:
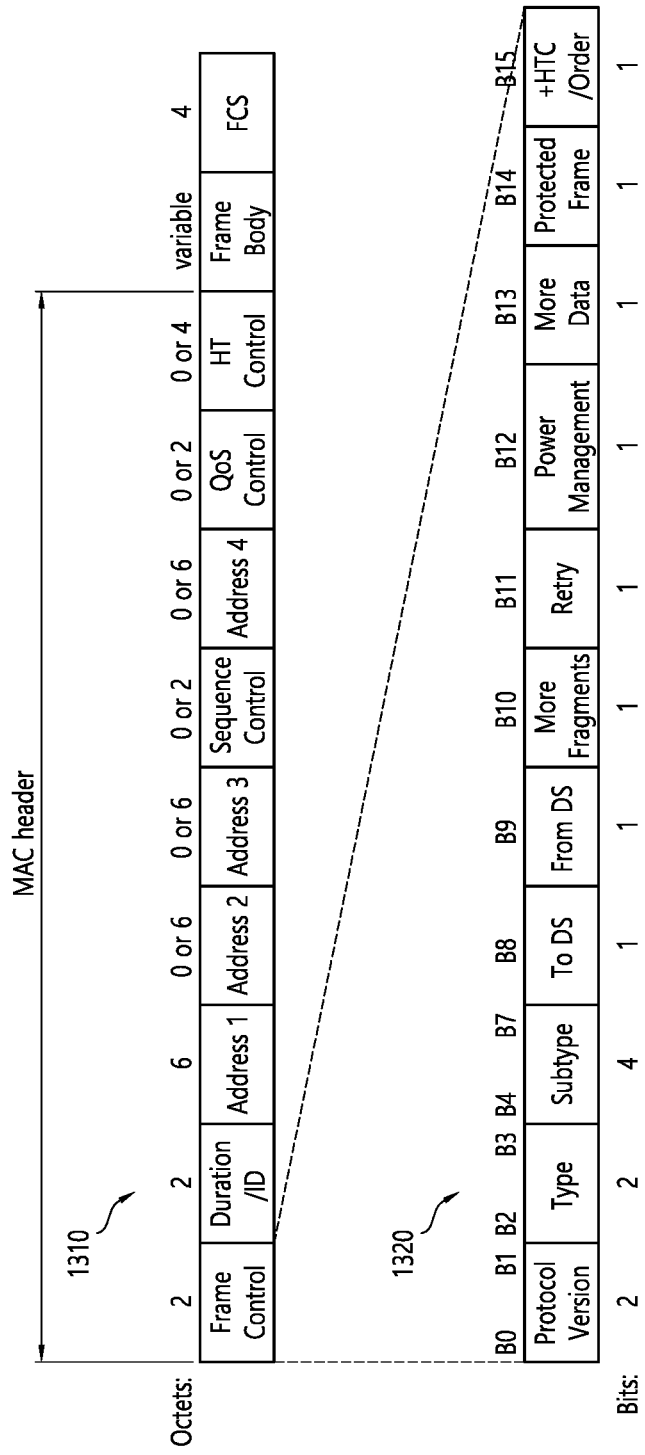
FIG. 13 shows a MAC frame format that is used in a wireless LAN system.

FIG. 13 shows a MAC frame format that is used in a wireless LAN system.

A MAC frame format (1310) includes a set of fields being generated in a fixed order in all frames. FIG. 13 shows a general MAC frame format. First three fields (frame control, Duration/ID and Address 1) and a last field (FCS) collectively configure a smallest frame format and exist in all frames including reserved types and subtypes. Address 2, Address 3, Sequence Control, Address 4, QoS Control, HT Control, and Frame Body fields exist only in a specific frame type and lower types.

Additionally, FIG. 13 illustrates a frame control field (1320) that is included in the MAC frame format.

First three subfields of the frame control field (1320) are Protocol Version, Type, and Subtype. Remaining subfields of the frame control field may vary according to configurations of the Type and Subtype subfields.

If the Type subfield value is not equal to 1, or if the Subtype subfield value is not equal to 6, the remaining subfields of the frame control field include To DS, From DS, More Fragments, Retry, Power Management, More Data, Protected Frame, and +HTC/Order subfields. In this case, the format of the frame control field is as shown in the lower part of FIG. 13.

In case the Type subfield value is equal to 1, or if the Subtype subfield value is equal to 6, the remaining subfields of the frame control field include Control Frame Extension, Power Management, More Data, Protected Frame, and +HTC/Order subfields (not shown).

4. Aggregate MPDU (A-MPDU)

Figure 14:
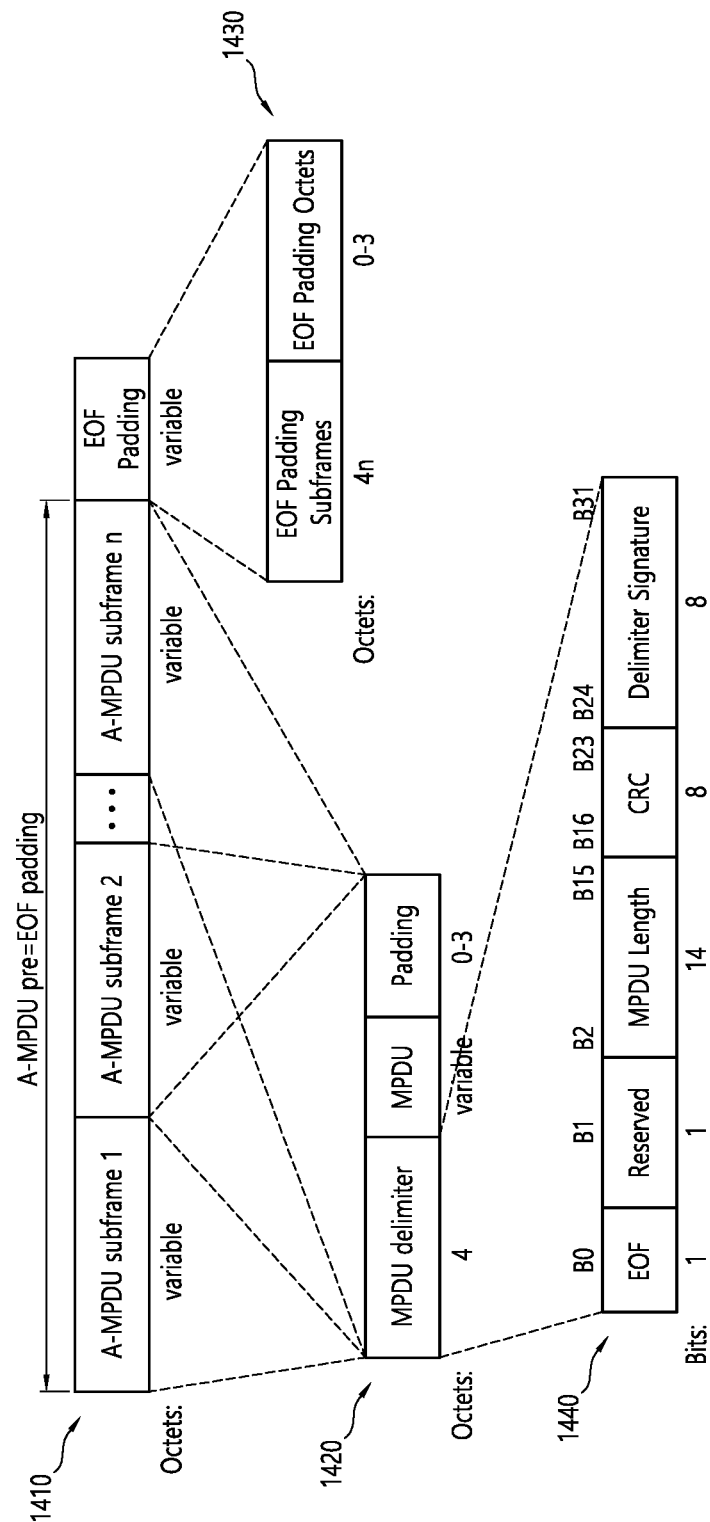
FIG. 14 shows an A-MPDU format that is used in a wireless LAN system.

FIG. 14 shows an A-MPDU format that is used in a wireless LAN system.

As shown in FIG. 14, A-MPDU (1410) is configured of a sequence of one or more A-MPDU subframes and EOF padding having various sizes.

Additionally, a structure of an A-MPDU subframe (1420) is shown in FIG. 14. Each A-MPDU subframe (1420) is configured of an MPDU delimiter (1440) optionally followed (succeeded) by an MPDU. Each non-final A-MPDU subframe of the A-MPDU additionally includes padding octets so that the length of the subframe is a multiple of a 4-octet length. Contents of such octets are yet to be determined.

In an HT PPDU, a final A-MPDU subframe is not padded.

Additionally, FIG. 14 also shows an EOF padding field (1430). The EOF padding field exists only in a VHT PPDU.

An EOF Padding Subframe subfield includes zero (0) or more EOF Padding subframes. An EOF Padding subframe is an A-MPDU subframe having 0 in an MPDU Length field and 1 in an EOF field.

In a VHT PPDU, padding may be determined according to the following rules.
- 0-3 octets in the padding subfield of the final A-MPDU subframe before the EOF padding subframe (See 1430 of FIG. 14). Content of these octets is not specified.
- 0 or more EOF padding subframes existing in the EOF Padding Subframe EOF subfield.
- 0-3 octets EOF Padding Octet subfield. Content of these octets is not specified.

A-MPDU pre-EOF padding corresponds to A-MPDU content that is not included in the EOF Padding field. A-MPDU pre-EOF padding includes all A-MPDU subframes having 0 in the MPDU length field and 0 in the EOF field in order to satisfy a smallest MPDU Start Interval requirement.

Additionally, FIG. 14 also illustrates an MPDU delimiter (1440). The MPDU delimiter (1440) has a length of 4 octets, and the MPDU delimiter (1440) of FIG. 14 shows a structure of an MPDU delimiter being transmitted by a non-DMG STA. A structure of an MPDU delimiter being transmitted by a DMG STA is a structure removing the EOF subfield from the MPDU delimiter, which is transmitted by a non-DMG STA (not shown).

Contents of the MPDU delimiter (1440) (non-DMG) may be defined as follows.

TABLE 14

| Field | Size (bits) | Description |
| --- | --- | --- |
| EOF | 1 | End of frame indication. Set to 1 in an A-MPDU subframe that has 0 in the MPDU Length field and that is used to pad the A-MPDU in a VHT PPDU as described in 10.13.6. Set to 1 in the MPDU delimiter of a VHT single MPDU as described in 10.13.7. Set to 0 otherwise. |

TABLE 14-continued

| Field | Size (bits) | Description |
|---|---|---|
| Reserved | 1 | |
| MPDU Length | 14 | Length of the MPDU in octets. Set to 0 if no MPDU is present. An A-MPDU subframe with 0 in the MPDU Length field is used as defined in 10.13.3 to meet the minimum MPDU start spacing requirement and also to pad the A-MPDU to fill the available octets in a VHT PPDU as defined in 10.13.6. |
| CRC | 8 | 8-bit CRC of the preceding 16 bits. |
| Delimiter Signature | 8 | Pattern that can be used to detect an MPDU delimiter when scanning for an MPDU delimiter. The unique patient is 0 × 4E (see NOTE below). |

NOTE—
The ASCII value of the character 'N' was chosen as the unique pattern for the value in the Delimiter Signature field.

5. Dedicated Short Range Communications (DSRC)

5.9 GHz DSRC is a short to medium range communications service that supports both public safety and private operations in roadside-to-vehicle and vehicle-to-vehicle communication environments. DSRC is devised as a complement to cellular communications by providing very high data transfer rates in situations where minimizing latency in the communication link and isolating relatively small communication zones are important. Additionally, PHY and MAC protocols are based on the revision of IEEE 802.11p for wireless access in a vehicular environment (WAVE).

<IEEE 802.11p>

802.11p uses PHY of 802.11a by performing 2× downclocking on the PHY. That is, 802.11p transmits a signal by using a 0 MHz bandwidth and not a 20 MHz bandwidth. The numerology comparing 802.11a to 802.11p is as follows.

TABLE 15

| | IEEE 802.11a | IEEE 802.11p |
|---|---|---|
| Symbol duration | 4 us | 8 us |
| Guard period | 0.8 us | 1.6 us |
| Subcarrier spacing | 312.5 kHz | 156.25 kHz |
| OFDM subcarrier | 52 | 52 |
| Number of pilot | 4 | 4 |
| Default BW | 20 MHz | 10 MHz |
| Data rate (Mbps) | 6, 9, 12, 18, 24, 36, 48, 54 Mbps | 3, 4.5, 6, 9, 12, 18, 24, 27 Mbps |
| Frequency band | 5 GHz ISM | 5.9 GHz dedicated |

Figure 15:
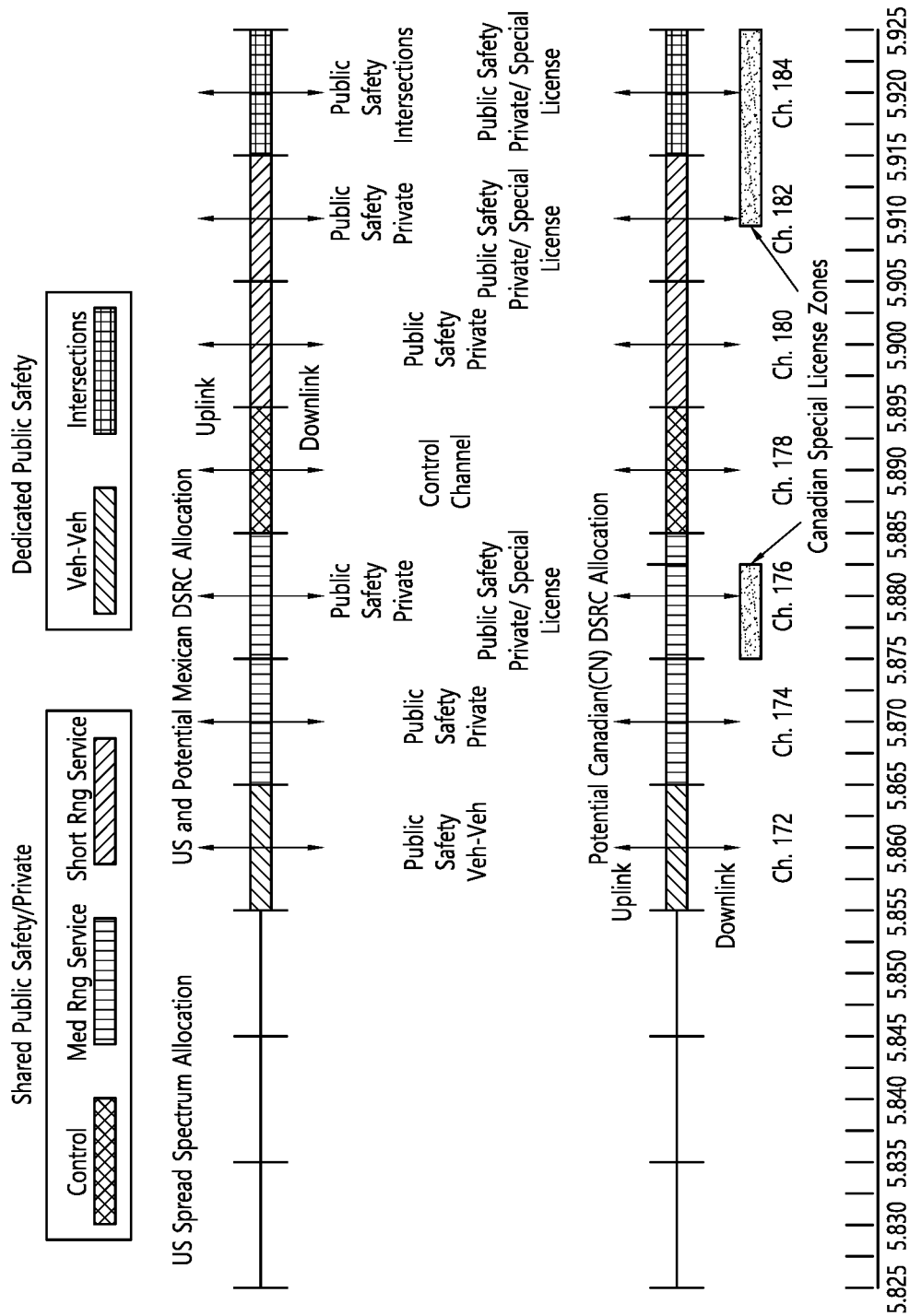
FIG. 15 shows a band plan of 5.9 GHz DSRC.

FIG. 15 shows a band plan of 5.9 GHz DSRC. Channels of a DSRC band include a control channel and a service channel, and each channel is capable of performing data transmission at 3, 4.5, 6, 9, 12, 18, 24, and 27 Mbps. If an option channel of 20 MHz exists, transmission at 6, 9, 12, 18, 24, 36, 48, and 54 Mbps may be performed. 6, 9, and 12 Mbps shall be supported in all services and channels. And, in case of a control channel, although a preamble is 3 Mbps, the message itself is 6 Mbps. In case channels 174 and 176 and channels 180 and 182 are authorized by a frequency regulation organization, the channel sets may be channels 175 and 181 of 20 MHz, respectively. The remaining channel shall be reserved for future usage. A short message or notification data, public safety alarm data, and so on, are broadcasted to all On Board Units (OBUs) through the control channel. The control channel and the service channel have been isolated in order to maximize efficiency and quality of service and to reduce interference between services.

Channel number 178 is a control channel, which automatically performed search and receives notification or data transmission, warning messages, and so on, from a Road Side Unit (RSU). All data of the control channel shall be transmitted within 200 ms and is repeated at a pre-defined cycle. In a control channel, public safety warnings have the highest priority over any other private messages. Private messages that are larger than 200 ms is transmitted through a service channel.

Private messages or long public safety messages, and so on, are transmitted through a service channel. In order to prevent collision (or conflict), a scheme for detecting channel status (i.e., Carrier Sense Multiple Access (CSMA)) is used prior to the transmission.

Hereinafter, EDCA parameters in an Outside Context of BSS (OCB) mode will be defined. An OCB mode denotes a state where direct communication between nodes can be performed without any procedure of being associated with an AP. The following shows a basic EDCA parameter set for STA operations, in case dot11OCBActivated is true.

TABLE 16

| AC | CWmin | CWmax | AIFSN | TXOP limit |
|---|---|---|---|---|
| AC_BK | aCWmin | aCWmax | 9 | 0 |
| AC_BE | aCWmin | aCWmax | 6 | 0 |
| AC_VI | (aCWmin + 1) / 2 − 1 | aCWmin | 3 | 0 |
| AC_VO | (aCWmin + 1) / 4 − 1 | (aCWmin + 1) / 2 − 1 | 2 | 0 |

The characteristics of the OCB mode are as follows.
In a MAC header, To/From DS fields=0
Address
Individual or a group destination MAC address
BSSID field=wildcard BSSID
Data/Management frame=>Address 1: RA, Address 2: TA, Address 3: wildcard BSSID
Not utilize IEEE 802.11 authentication, association, or data confidentiality services
TXOP limit=0
Use TC(TID) only
A STA is not required to synchronize to a common clock or to use these mechanisms
STAs may maintain a TSF timer for purposes other than synchronization
The STA may send Action frames and, if the STA maintains a TSF Timer, Timing Advertisement frames
The STA may send Control frames, except those of subtype PS-Poll, CF-End, and CF-End+CFAck
The STA may send Data frames of subtype Data, Null, QoS Data, and QoS Null
A STA with dot11OCBActivated equal to true shall not join or start a BSS 6. Embodiments that are Applicable to the Present Disclosure A next generation vehicular (NGV) system, which is being proposed in order to enhance 2× throughput and to support high speed in contrast with an 11p system that is used for V2X at a 5.9 GHz band, may transmit signals by using a wide bandwidth. This specification proposes a method for configuring a frame format for transmitting signals by using a 20 MHz bandwidth in order to achieve enhanced performance in NGV.

In order to allow V2X to be easily supported at a 5.9 GHz band, technical development for NGV considering throughput enhancement and high speed support of DSRC (11p) is in progress, and, in order to achieve 2× throughput enhancement, a wide bandwidth (20 MHz) transmission instead of the conventional 10 MHz transmission is being considered. Additionally, NGV channel support at least one operation of interoperability/backward compatibility/coexistence with the conventional 11p. Therefore, a 20 MHz frame format for supporting the aforementioned operation(s) and for transmitting signals by using a 20 MHz bandwidth is needed. This specification proposes a method for configuring a frame format for 20 MHz transmission.

Figure 16:
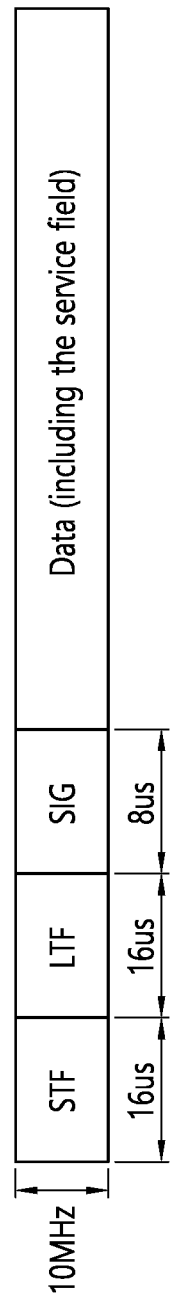
FIG. 16 shows a frame format of an 802.11p system.

An 802.11p packet supporting vehicle-to-vehicle communication at a 5.9 GHz band may be configured for a 10 MHz band by applying OFDM numerology of 11a, and the packet uses a frame format shown in FIG. 16.

FIG. 16 shows a frame format of an 802.11p system.

As shown in FIG. 16, an 11p frame is configured of an STF for sync and AGC, an LTF for channel estimation, and a signal (SIG) field including information on a data field. Additionally, in FIG. 16, a data field includes a service field, and the service field is configured of 16 bits.

Since the 11p frame is configured by applying the same OFDM numerology as 11a for the 10 MHz band, the 11p frame has a symbol duration (wherein one symbol duration is equal to 8 us) that is longer than 11a. That is, in the aspect of time, a frame of 11p has a length that is two times longer than a frame of 11a.

6.1. Frame format of NGV

Figure 17:
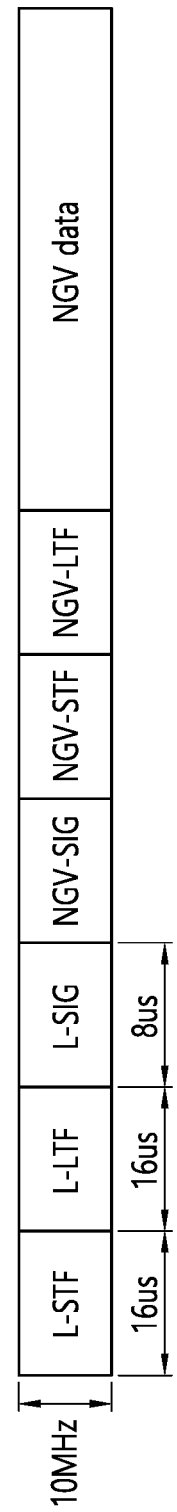
FIG. 17 shows an example of an NGV PPDU format.

FIG. 17 shows an example of an NGV PPDU format.

A 10 MHz NGV frame, which is being proposed in order to enhance throughput and to support high speed in contrast with 11p using the frame format of FIG. 16, may be configured as shown in FIG. 17. The NGV PPDU of FIG. 17 may include a preamble part of 11p for backward compatibility with 11p.

As shown in FIG. 17, in order to achieve backward compatibility with 11p, which uses a 5.9 GHz band, the frame is configured by positioning STF, LTF, and SIG (L-STF, L-LTF, and L-SIG of FIG. 17), which configure the preamble of 11p, at the beginning (or foremost end) of the frame. Additionally, the frame may be configured of a symbol configuring NGV-SIG, NGV-STF, NGV-LTF, and so on, which include control information for NGV, after the L-SIG, and NGV-data.

FIG. 17 is merely an example of an NGV frame format. And, adding an OFDM symbol for NGV frame differentiation after the L-part (L-STF, L-LTF, and L-SIG) may be taken into consideration. That is, an NGV frame format may be configured to have the structure shown in FIG. 18.

Figure 18:
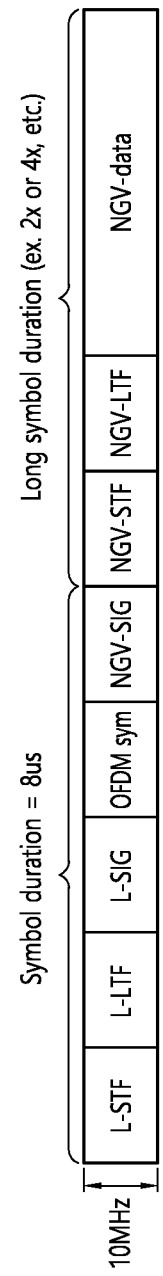
FIG. 18 shows another example of an NGV PPDU format.

FIG. 18 shows another example of an NGV PPDU format.

Additionally, the frame may be configured by positioning OFDM symbols for indicating an NGV frame format or for indicating information on an NGV frame in front of the NGV control field. At this point, the number symbols being positioned in front of NGV-SIG may be equal to 1 or more, and the symbol may be a symbol wherein L-SIG is repeated (RL-SIG).

As shown in FIG. 18, the NGV part (NGV-STF, NGV-LTF, NGV-data) may be configured of a symbol having the same symbol length (i.e., 156.25 kHz) as 11p or may be configured of a symbol having a longer symbol length (i.e., 78.125 kHz) than an 11p symbol.

Figure 19:
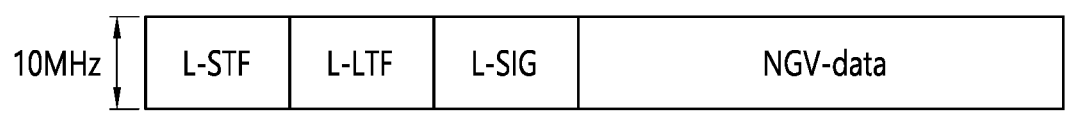
FIG. 19 shows yet another example of an NGV PPDU format.

FIG. 19 shows yet another example of an NGV PPDU format.

Unlike FIG. 17 and FIG. 18, in order to fully support interoperability with 11p, an NGV frame or NGV PPDU may be transmitted via 11p transmission, i.e., in case a 11p PPDU is not detected (e.g., preamble detection, packet detection) or in case an 11p device does not exist. As described above, in case a signal transmission for an 11p device does not exist in a channel, or in case an 11p device using the corresponding channel does not exist, the NGV frame format may be configured identically as the conventional 11p frame format, as shown in FIG. 19. At this point, the NGV frame format may be configured by using a tone pan that is different from that of 11p. For example, NGV 10 MHz transmission may be performed by applying 2× Down-Clocking (DC) to a tone plan of 11ac 20 MHz.

As described above, since NGV uses a number of available tones larger than 11p, in order to perform channel estimation for such tone, an extra tone is added to L-SIG and then transmitted. At this point, indexes of an extra tone are (−28 −27 27 28).

Also, in FIG. 19, L-SIG may be repeatedly positioned (RL-SIG) after L-SIG in order to perform packet classification for an 11bd frame. Subsequently, an NGV-SIG field including information on 11bd transmission may be positioned, so as to configure an 11bd frame. At this point, an extra tone may also be added to the repeated L-SIG (RL-SIG), and the NGV-SIG may transmit information by using a larger number of available tones equivalent to the added extra tone. At this point, tone indexes of an extra tone are [−28 −27 27 28]. And, since a combine gain may be obtained by a receiving end by repeatedly transmitting the L-SIG, this shall be advantageous in extending the range for 11bd transmission.

A frame format for transmitting signals by using a 20 MHz bandwidth, based on a frame format for the 10 MHz transmission, may be configured as described below. That is, a 20 MHz NGV frame format may be configured based on the 10 MHz NGV frame format shown in FIG. 17 and FIG. 18.

1) Leveraging the Conventional Wide Bandwidth Frame Format

Figure 20:
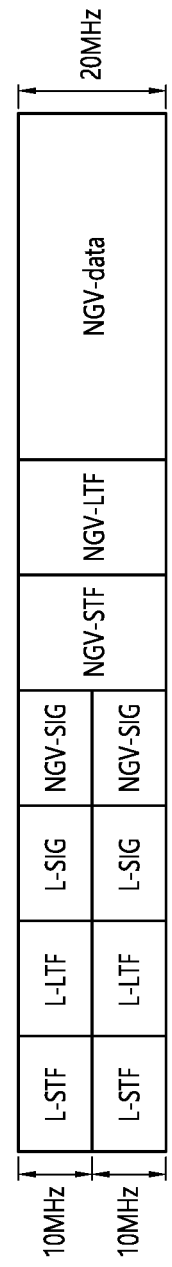
FIG. 20 shows an example of an NGV PPDU format being transmitted at a 20 MHz band.

FIG. 20 shows an example of an NGV PPDU format being transmitted at a 20 MHz band.

A. An L-part (L-STF, L-LTF, and L-SIG) and NGV-SIG are configured to have a duplicated structure in 10 MHz channel units, and an NGV part (NGV-STF, NGV-LTF, NGV-data) is configured based on full 20 MHz.

i. The NGV part that is configured by using the full band (i.e., 20 MHz) may be configured as described below.

i-1. The NGV part may be configured by reusing an 11ac 20 MHz format without downclocking.

i-2. The NGV part may be configured by performing 2× downclocking on an 11ac 40 MHz format.

i-3. The NGV part may be configured by performing 4× downclocking on an 11ac 80 MHz format.

B. Since the NGV part is transmitted by using a wide bandwidth, information on the BW is transmitted through the NGV-SIG field, and the NGV-STA may know the frame format according to the bandwidth through the received information.

C. The frame format for 20 MHz bandwidth transmission, which is configured as described above, may be configured as shown in FIG. 20.

D. As described above, the NGV part (NGV-STF, NGV-LTF, NGV-data) may be configured by using a same OFDM numerology as the legacy part (11p preamble part) (i.e., subcarrier spacing=156.25 kHz) or by using a numerology having a symbol length that is 2 times longer than the legacy part (i.e., subcarrier spacing=78.125 kHz). And, in the frame, since the L-part always exists in front of the NGV part, and since the L-part is always transmitted prior to the NGV part, the NGV STA may apply information on AGC, channel estimation, and so on, which have been performed by using the received L-part, to the NGV part. Therefore, 20 MHz channel transmission may be performed by using a frame format that is different from the frame format that is described above.

Figure 21:
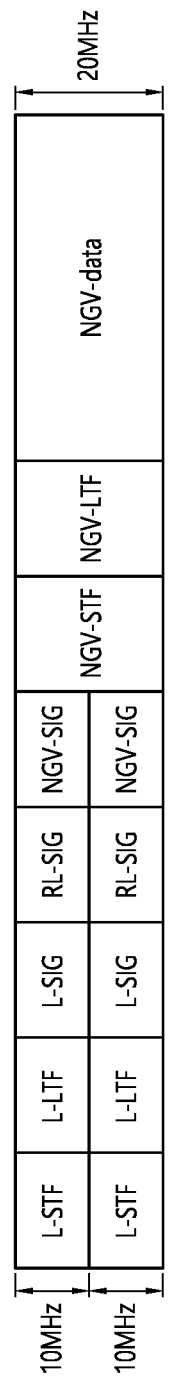
FIG. 21 shows another example of an NGV PPDU format being transmitted at a 20 MHz band.

FIG. 21 shows another example of an NGV PPDU format being transmitted at a 20 MHz band.

Additionally, in an NGV PPDU, a repeated L-SIG (RL-SIG) symbol may be positioned in front of the NGV-SIG for range extension and PPDU differentiation. An extra tone may be used in order to transmit a larger amount of information through the NGV-SIG. And, herein, the extra tone may be used for channel estimation and may be added to the L-SIG and the repeated L-SIG (RL-SIG) symbol. At this point, tone indexes of the extra tone are [−28 −27 27 28]. The frame format for 20 MHz bandwidth transmission, which is configured as described above, may be configured as shown in FIG. 21.

E. Additionally, 11bd may perform 20 MHz channel transmission by using a frame format that is different from the above-described frame format.

Figure 22:
FIG. 22 shows an example of an NGV PPDU format being transmitted at a 20 MHz band and not including NGV-STF.

FIG. 22 shows an example of an NGV PPDU format being transmitted at a 20 MHz band and not including NGV-STF.

i. A Frame Format not Including NGV-STF i-1. When performing 20 MHz transmission, the L-part is already transmitted prior to the NGV part, and the NGV STA may perform AGC for 20 MHz by using the L-STF. Therefore, in case the NGV part uses the same numerology as the legacy part, AGC estimation does not need to be performed separately in the NGV part. Additionally, even if the NGV part has been configured by using a different numerology (e.g., 4× DC), since power control may be performed by using AGC, which is obtained by using the conventional (or existing) L-STF, additional AGC estimation does not need to be performed for the NGV part. Therefore, in this case, the NGV-STF does not need to be configured, and, accordingly, the frame format may be configured as shown in FIG. 22. Additionally, since 11bd does not perform MIMO transmission, power control per receiving antenna is not needed. Therefore, an STF does not need to be separately configured.

i-2. Therefore, in this case, the NGV-STF does not need to be configured, and, accordingly, the frame format may be configured as described above.

i-3. Since a separate NGV-STF is not configured for AGC estimation, frame overhead may be reduced.

i-4. In FIG. 22, the NGV-SIG may be modulated based on Q-BPSK.

i-5. In the structure of FIG. 22, the NGV-SIG is merely an example. And, therefore, the L-SIG may be repeated, or an OFDM symbol that is modulated based on Q-BPSK for 11bd PPDU differentiation may be positioned instead of the NGV-SIG symbol. Additionally, the repeated L-SIG or one OFDM symbol being modulated based on Q-BPSK may be positioned in front of the NGV-SIG symbol.

Figure 23:
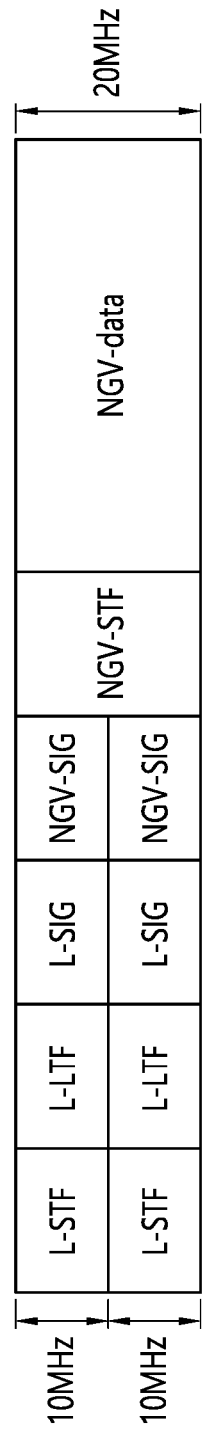
FIG. 23 shows an example of an NGV PPDU format being transmitted at a 20 MHz band and not including NGV-LTF.

FIG. 23 shows an example of an NGV PPDU format being transmitted at a 20 MHz band and not including NGV-LTF.

ii. A Frame Format not Including NGV-LTF ii-1. When performing 20 MHz transmission, the L-part is already transmitted prior to the NGV part, and the NGV STA may perform channel estimation for 20 MHz by using the L-LTF. Therefore, in case the NGV part uses the same numerology as the legacy part, channel estimation does not need to be performed separately in the NGV part. In case the NGV part has been configured by using a different numerology (e.g., 4× DC), since tone spacing is 2 times smaller, a channel estimation value that was obtained by using the existing L-LTF may be applied to two carriers. And, accordingly, the NGV-LTF does not need to be configured in order to perform additional channel estimation for the NGV part. Additionally, a channel may be estimated by using the NGV-STF. Therefore, in this case, the NGV-LTF for channel estimation does not need to be configured, and, accordingly, the frame format may be configured as shown in FIG. 23.

ii-2. Since a separate NGV-LTF is not configured for channel estimation, frame overhead may be reduced.

ii-3. In FIG. 23, the NGV-SIG may be modulated based on Q-BPSK.

ii-4. In FIG. 23, the NGV-SIG is merely an example. And, therefore, the L-SIG may be repeated, or an OFDM symbol that is modulated based on Q-BPSK for 11bd PPDU differentiation may be positioned instead of the NGV-SIG symbol. Additionally, the repeated L-SIG (RL-SIG) or one OFDM symbol being modulated based on Q-BPSK may be positioned in front of the NGV-SIG symbol.

Figure 24:
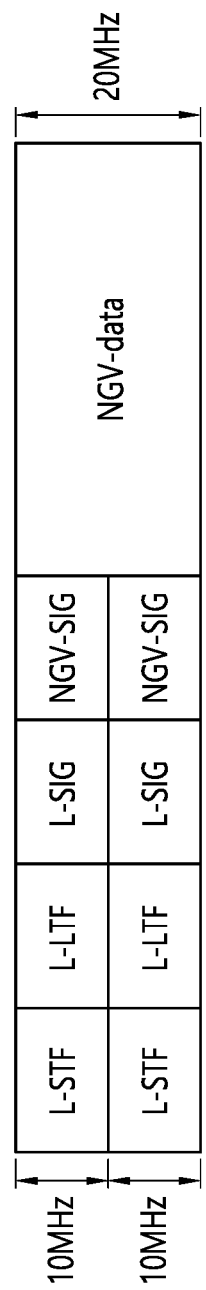
FIG. 24 shows an example of an NGV PPDU format being transmitted at a 20 MHz band and not including NGV-STF and NGV-LTF.

FIG. 24 shows an example of an NGV PPDU format being transmitted at a 20 MHz band and not including NGV-STF and NGV-LTF.

iii. A Frame Format not Including NGV-STF and NGV-LTF iii-1. When performing 20 MHz transmission, the L-part is already transmitted prior to the NGV part, and the NGV STA may perform AGC and channel estimation for 20 MHz by using the L-STF and L-LTF. Therefore, in case the NGV part uses the same numerology as the legacy part, AGC estimation and channel estimation do not need to be performed separately in the NGV part. In case the NGV part has been configured by using a different numerology (e.g., 4× DC), since tone spacing is 2 times smaller, AGC estimation and channel estimation information that was obtained by using the existing L-STF and L-LTF may be used by being applied to the NGV part. For example, in case of configuring the NGV data by using 4× DC, since the tone spacing becomes 2 times smaller than the L-part, little change may occur in the channel in light of the frequency. Therefore, data may be estimated by applying the information on the channel, which was estimated for the carrier by using L-LTF, to 2 subcarriers of the NGV data part. As described above, since the information estimated by using the L-STF and L-LTF may be used, the NGV-STF and NGV-LTF for AGC estimation and channel estimation do not need to be configured. And, accordingly, the frame format may be configured as shown in FIG. 24.

iii-2. Since separate NGV-STF and NGV-LTF are not configured for AGC estimation and channel estimation, frame overhead may be reduced.

iii-3. In FIG. 24, the NGV-SIG may be modulated based on Q-BPSK.

Figure 25:
FIG. 25 shows another example of an NGV PPDU format being transmitted at a 20 MHz band and not including NGV-STF and NGV-LTF.

FIG. 25 shows another example of an NGV PPDU format being transmitted at a 20 MHz band and not including NGV-STF and NGV-LTF.

iii-4. In FIG. 24, the NGV-SIG is merely an example. And, therefore, the L-SIG may be repeated, or an OFDM symbol that is modulated based on Q-BPSK for 11bd PPDU differentiation may be positioned instead of the NGV-SIG symbol. Additionally, the repeated L-SIG (RL-SIG) or one OFDM symbol being modulated based on Q-BPSK may be positioned in front of the NGV-SIG symbol. At this point, a frame format having the repeated L-SIG (RL-SIG) positioned in front of the NGV-SIG symbol may be configured as shown in FIG. 25.

FIG. 26 shows an example of an NGV PPDU format being transmitted at a 20 MHz band and being configured only of an L-part and NGV-data.

iv. In Case of being Configured Only of L-Part and NGV Data Part:

iv-1. When performing 20 MHz transmission, the L-part is already transmitted prior to the NGV part, and the NGV STA may perform AGC and channel estimation for 20 MHz by using the L-STF and L-LTF. Therefore, in case the NGV part uses the same numerology as the legacy part, AGC estimation and channel estimation do not need to be performed separately. Therefore, the NGV-STF and NGV-LTF may be omitted.

Figure 27:
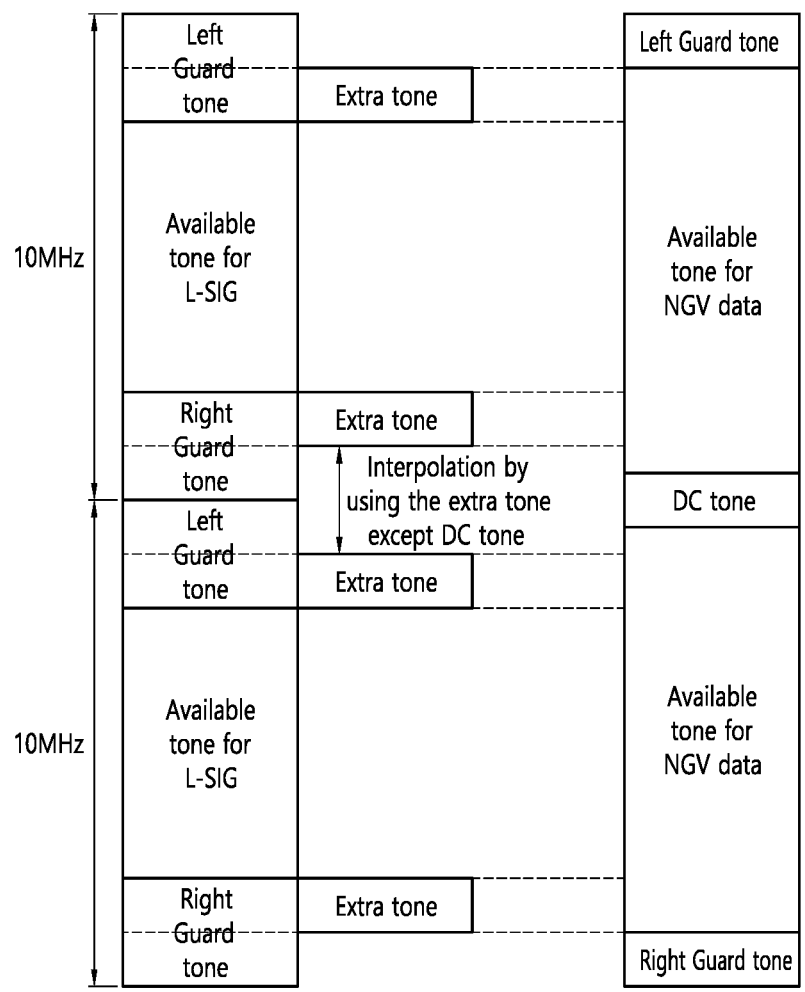
FIG. 27 shows an example of a tone plan for the NGV PPDU format of FIG. 26.

FIG. 27 shows an example of a tone plan for the NGV PPDU format of FIG. 26.

Figure 28:
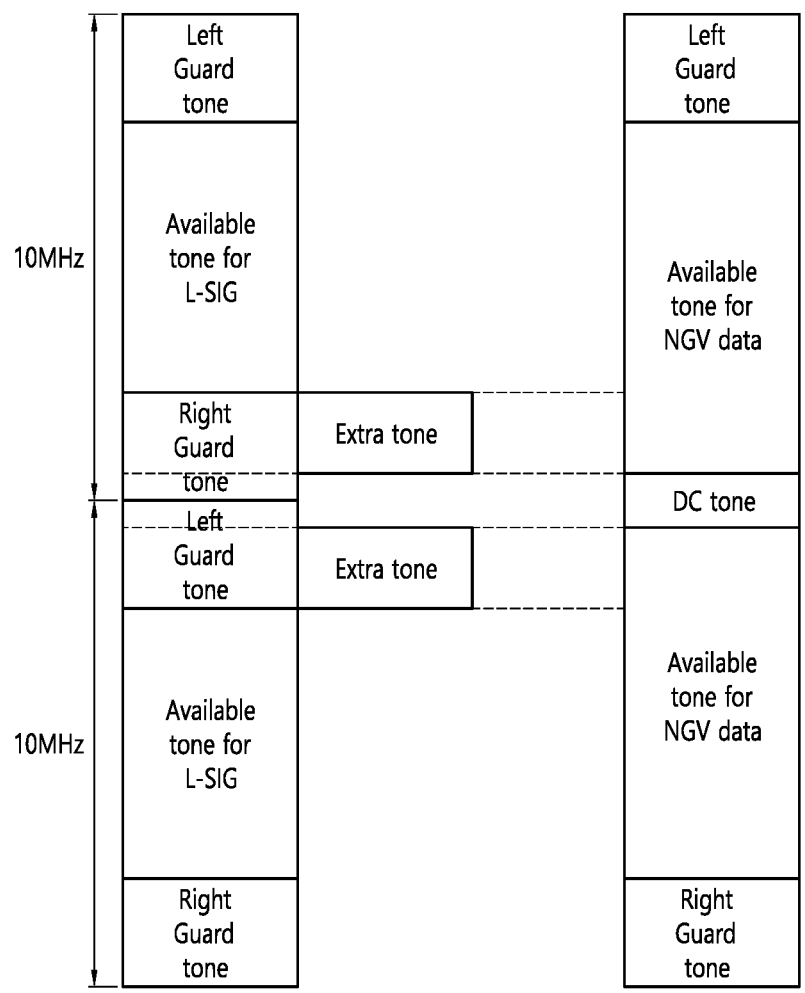
FIG. 28 shows another example of a tone plan for the NGV PPDU format of FIG. 26.

FIG. 28 shows another example of a tone plan for the NGV PPDU format of FIG. 26.

iv-2. As shown in FIG. 27 and FIG. 28, since the Legacy part is duplicated in 10 MHz units, and since the NGV data part is transmitted using an entire bandwidth, the available tones for L-SIG and data may be different. Therefore, an extra tone may be used by being added to the L-SIG in order to perform channel estimation for the available tones, which are used when performing NGV data transmission. For example, when performing 10 MHz transmission, in case the NGV data uses a 20 MHz tone plan of 11ac, 4 extra tones may be transmitted by being added to the L-SIG. And, at this point, the tone indexes are [−28 −27 27 28].

A. For example, in case of using a same guard tone as 11ac 20 MHz when performing 20 MHz transmission, the NGV data part may configure a frame as shown in FIG. 27 and may perform 20 MHz transmission.

i. As shown in FIG. 27, since channel estimation cannot be performed for all of the available tones by using L-SIG, channel estimation may be performed via interpolation using a left extra tone and a right extra tone of a lower 10 MHz band and an upper 10 MHz band.

B. Additionally, a transmitting device may configure a frame, as shown in FIG. 28, and may perform 20 MHz transmission. An extra tone may be added, as shown in FIG. 28, in case guard tones (i.e., left guard (e.g., 6 tone) and right guard (e.g., 5 tone)) of the L-part and the NGV data part are the same. At this point, tones indexes of the extra tone are [27 28 29 30] in the upper 10 MHz band and [−30 −29 −28 −27] in the lower 10 MHz band.

FIG. 28 is merely an example, and, in case the number of available tones is different, the extra tone may be added not only to the center tone including DC as well as the tones on both sides in order to perform channel estimation in light of the frequency.

3. Channel estimation for the NGV data part may be performed by using the extra tone, which is added to the L-SIG, as described above.

4. Since the NGV PPDU format of FIG. 24 does not separately configure an NGV-STF for AGC estimation, an NGV-LTF for channel estimation, and a control field, the frame overhead may be reduced.

5. Unlike Section 4, transmission may be performed by using a frame structure wherein L-SIG is repeated (RL-SIG) for robust transmission of 11bd.

Figure 29:
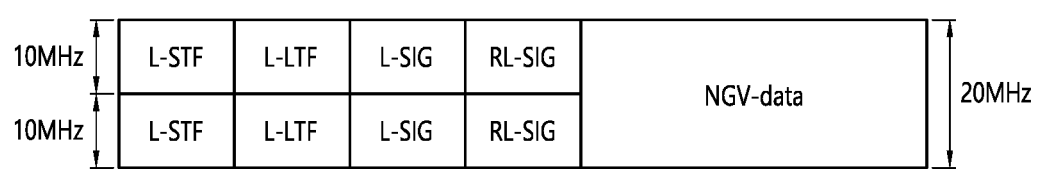
FIG. 29 shows a PPDU format adding an RL-SIG to the NGV PPDU format of FIG. 26.

FIG. 29 shows a PPDU format adding an RL-SIG to the NGV PPDU format of FIG. 26.

A. Information on 11p and NGV frame formats may be indicated by using the RL-SIG.

i. For example, the information may be indicated by using the polarity of the RL-SIG.

B. An extra tone may be used in the L-SIG and RL-SIG. And, in this case, 4 extra tones may all be used for channel estimation or only the 4 extra tones applied to L-SIG may be used.

i. Information on the NGV data field, e.g., information on BW, coding, format, and so on, may be notified by using the 4 extra tones that are used in the RL-SIG.

Figure 30:
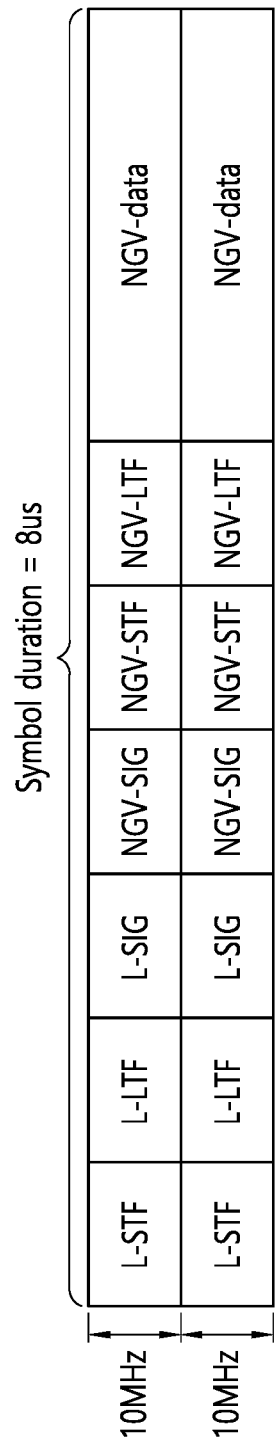
FIG. 30 shows an example of an NGV PPDU format with duplicated L-part and NGV-part.

2) Configure NGV Frame by Duplicating all 10 MHz Unit Frame Formats when Performing Transmission at 20 MHz Bandwidth FIG. 30 shows an example of an NGV PPDU format with duplicated L-part and NGV-part.

Unlike the embodiment of 1), in order to support interoperability, when performing the 20 MHz bandwidth transmission, the NGV frame may be configured as shown in FIG. 30.

A. When performing wide bandwidth transmission, a frame is configured by duplicating a 10 MHz unit frame format within the wide band.

B. The L-part (L-STF, L-LTF, and L-SIG) and NGV-SIG/one OFDM symbol may be configured to have a structure of being duplicated in 10 MHz channel units, and the NGV part (NGV-STF, NGV-LTF, and NGV-data) is also configured by being duplicated in 10 MHz channel units just as the L-part.

C. At this point, the NGV data being transmitted through each 10 MHz channel may be loaded by having encoded data distributed to each 10 MHz channel or may be loaded by having the encoding process performed separately on different data per 10 MHz. Additionally, the same data may be repeated and then transmitted.

i. The OFDM symbol for NGV data transmission is configured by using the same carrier spacing as the conventional 11p.

ii. In order to enhance transmission efficiency, the NGV data may be transmitted by using a 40 MHz tone plan of 11ac. In the above-described structure, the tone spacing of the NGV-part may be configured by using ½ of the 11p tone spacing, which corresponds to 78.125 kHz.

D. In the above-described structure, in order to achieve reliability enhancement, range extension, and packet classification, a frame may be configured by positioning a symbol, wherein L-SIG is repeated (RL-SIG), between the L-SIG and the NGV-SIG.

E. As described above, since a signal is transmitted by using the duplicated frame format of a legacy system, when performing 20 MHz transmission, since there is no influence on the legacy system, interoperability may be fully supported.

F. As described above, in case of performing wide bandwidth transmission by using a duplicated frame, in order to transmitted a larger amount of data to an NGV device, the NGV part may configure a frame by allocating an extra tone. That is, transmission may be performed by using tone allocation that is different from 11p, e.g., tone allocation of a 20 MHz band of 11ac.

i. An extra tone that is allocated for an NGV device is decoded and used only by the NGV device. And, an 11p device recognizes the extra tone as a guard tone, and, therefore, the 11p device does not decode the extra tone.

i-1. Therefore, as described above, by using an extra tome, interoperability with the conventional 11p STA may be maintained, and a larger number of tones may be used for the NGV device.

ii. The extra tone for the NGV STA may be added as described below.

ii-1. An AP configures a frame by adding an extra tone only in the NGV part, i.e., starting from NGV-STF.

ii-2. In order to transmit a larger amount of information through the NGV-SIG field, an extra tone is applied starting from the L-SIG field. At this point, the extra tone that is being transmitted through the L-SIG is used in order to perform channel estimation for an extra tone of the NGV field.

ii-2-A. At this point, tone indexes of the extra tone are [−28 −27 27 28]. In case the L-SIG is repeated (RL-SIG) after the L-SIG, the extra tone is equally repeated.

ii-3. Unlike in the description provided above, the extra tone may be transmitted by being applied from the beginning (or start) of the frame. And, at this point, the 11p STA receives a signal by using only the remaining tones excluding the extra tone, as in the conventional method, and, when receiving the signal, the NGV STA receives the signal by using all of the tones including the extra tone.

Figure 31:
FIG. 31 shows an example of a PPDU format not including NGV-STF in the NGV PPDU format of FIG. 30.

FIG. 31 shows an example of a PPDU format not including NGV-STF in the NGV PPDU format of FIG. 30.

Figure 32:
FIG. 32 shows an example of a PPDU format not including NGV-LTF in the NGV PPDU format of FIG. 30.

FIG. 32 shows an example of a PPDU format not including NGV-LTF in the NGV PPDU format of FIG. 30.

Figure 33:
FIG. 33 shows an example of a PPDU format not including NGV-STF and NGV-LTF in the NGV PPDU format of FIG. 30.

FIG. 33 shows an example of a PPDU format not including NGV-STF and NGV-LTF in the NGV PPDU format of FIG. 30.

Figure 34:
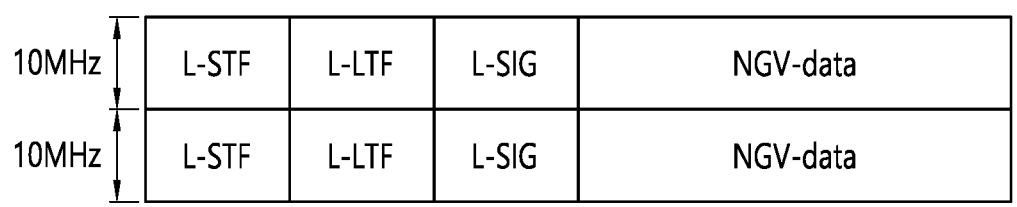
FIG. 34 shows an example of a PPDU format not including NGV-STF, NGV-LTF, and NGV-SIG in the NGV PPDU format of FIG. 30.

FIG. 34 shows an example of a PPDU format not including NGV-STF, NGV-LTF, and NGV-SIG in the NGV PPDU format of FIG. 30.

G. Since a duplicated frame format is used for performing 20 MHz transmission, unlike in the description provided above, a signal may be transmitted by using the frame format shown in FIG. 31 to FIG. 34. Herein, the frame format of FIG. 31 to FIG. 34 is merely exemplary. And, although it is not shown in FIG. 31 to FIG. 34, L-SIG may be repeatedly configured (RL-SIG) after the L-SIG in order to perform range extension and packet classification.

i. A Frame Format not Including NGV-STF i-1. When performing 20 MHz transmission, the L-part is already transmitted prior to the NGV part, and the NGV STA may perform AGC for 20 MHz by using the L-STF. Therefore, in case the NGV part uses the same numerology as the legacy part, AGC estimation does not need to be performed separately in the NGV part. Additionally, even if the NGV part has been configured by using a different numerology (e.g., 4× DC), since power control may be performed by using AGC, which is obtained by using the conventional (or existing) L-STF, additional AGC estimation does not need to be performed for the NGV part. Therefore, in this case, the NGV-STF does not need to be configured, and, accordingly, the frame format may be configured as shown in FIG. 31.

i-2. Since a separate NGV-STF is not configured for AGC estimation, frame overhead may be reduced.

ii. A frame format not including NGV-LTF ii-1. When performing 20 MHz transmission, the L-part is already transmitted prior to the NGV part, and the NGV STA may perform channel estimation for 20 MHz by using the L-LTF. Therefore, in case the NGV part uses the same numerology as the legacy part, channel estimation does not need to be performed separately in the NGV part. In case the NGV part has been configured by using a different numerology (e.g., 4× DC), since tone spacing is 2 times smaller, a channel estimation value that was obtained by using the existing L-LTF may be applied to two carriers. And, accordingly, the NGV-LTF does not need to be configured in order to perform additional channel estimation for the NGV part. Therefore, in this case, the NGV-LTF for channel estimation does not need to be configured, and, accordingly, the frame format may be configured as shown in FIG. 32.

ii-2. Since a separate NGV-LTF is not configured for channel estimation, frame overhead may be reduced.

iii. A frame format not including NGV-STF and NGV-LTF iii-1. When performing 20 MHz transmission, the L-part is already transmitted prior to the NGV part, and the NGV STA may perform AGC and channel estimation for 20 MHz by using the L-STF and L-LTF. Therefore, in case the NGV part uses the same numerology as the legacy part, AGC estimation and channel estimation do not need to be performed separately. In case the NGV part has been configured by using a different numerology (e.g., 4× DC), since tone spacing is 2 times smaller, AGC estimation and channel estimation information that was obtained by using the existing L-STF and L-LTF may be used by being applied to the NGV part. For example, in case of configuring the NGV data by using 4× DC, since the tone spacing becomes 2 times smaller than the L-part, little change may occur in the channel in light of the frequency. Therefore, data may be estimated by applying the information on the channel, which was estimated for the carrier by using L-LTF, to 2 subcarriers of the NGV data part. As described above, since the information estimated by using the L-STF and L-LTF may be used, the NGV-STF and NGV-LTF for AGC estimation and channel estimation do not need to be configured. And, accordingly, the frame format may be configured as shown in FIG. 33.

iii-2. Since separate NGV-STF and NGV-LTF are not configured for AGC estimation and channel estimation, frame overhead may be reduced.

iii-3. Unlike in the description provided above, for robust transmission or for packet classification, NGV transmission may be performed by using a structure including RL-SIG.

iii-3-A. Indication may be provided for 11p PPDU and NGV PPDU or NGV frame format by using the RL-SIG.

iii-3-A-i. For example, the information may be indicated by using the polarity of the RL-SIG.

iii-3-B. An extra tone may be used in the L-SIG and RL-SIG. And, in this case, 4 extra tones may all be used for channel estimation or only the 4 extra tones applied to L-SIG may be used.

iii-3-B-i. Information on the NGV data field, e.g., information on BW, coding, format, and so on, may be notified in advance by using the 4 extra tones that are used in the RL-SIG.

iv. A frame format not including NGV-STF, NGV-LTF, and NGV-SIG field

1. When performing 20 MHz transmission, the L-part is already transmitted prior to the NGV part, and the NGV STA may perform AGC and channel estimation for 20 MHz by using the L-STF and L-LTF.

2. In order to use a larger number of tones for the NGV data transmission, and extra tone may be added to the L-SIG, and, by using the extra tone, channel estimation may be performed on an NGV-Data tone that is additionally used. As described above, since information that is estimated by using the L-STF, L-LTF, and L-SIG may be used, there is no need to configure NGV-STF and NGV-LTF for performing AGC estimation and channel estimation and NGV-SIG for estimating an NGV-Data tone. And, accordingly, the frame format may be configured as shown in FIG. 34.

3. Unlike in the description provided above, for robust transmission or for packet classification, NGV transmission may be performed by using a structure including RL-SIG.

A. Indication may be provided for 11p PPDU and NGV PPDU or NGV frame format by using the RL-SIG.

i. For example, the information may be indicated by using the polarity of the RL-SIG.

B. An extra tone may be used in the L-SIG and RL-SIG. And, in this case, 4 extra tones may all be used for channel estimation or only the 4 extra tones applied to L-SIG may be used.

i. Information on the NGV data field, e.g., information on BW, coding, format, and so on, may be notified by using the 4 extra tones that are used in the RL-SIG.

v. In case of transmitting an NGV signal by using the duplicated frame format, as described above, the data being transmitted through each 10 MHz channel in order to increase throughput of NGV data transmission may be different from one another, and, in order to increase reliability of the NGV transmission, the NGV data may be transmitted by repeating the same data.

1. Information on the format of data being transmitted through the 10 MHz channel may be transmitted through the NGV-SIG.

A. In order to indicate a transmission format of the NGV-data, the NGV-SIG field may allocate 1 bit to a frame format/transmission mode, so as to indicate to the STA whether the data is duplicated and then transmitted, as described above, or whether another data is transmitted.

B. In the description provided above, in the NGV-SIG field that is configured per 10 MHz, the same information may be duplicated, or different types of information may be transmitted through a 10 MHz channel.

2. In case different data are transmitted, a signal may be transmitted by applying different types of modulation to each 10 MHz channel.

3) Structure of Transmitting More Information from NGV-SIG by Using 4 Extra Tones In order to transmit a larger amount of control information in the frame structure proposed in the present embodiment, the larger amount of information may be transmitted from the NGV-SIG by using 4 extra tones (wherein the tone indexes for 10 MHz are −28, −27, 27, 28).

i. The NGV-SIG symbol may transmit a signal by using 56 available subcarriers (or tones).

ii. In order to perform channel estimation on the extra tone, 4 extra tones (e.g., the tone indexes being −28, −27, 27, 28) may also be used in the L-SIG. And, in this case, the 4 extra tones shall only be used for channel estimation.

iii. In order to perform channel estimation with more accuracy, the 4 extra tones for channel estimation may also be used in the L-LTF.

Hereinafter, the embodiment of the present disclosure that is described above with reference of FIG. 13 to FIG. 34 will be described in more detail.

Figure 35:
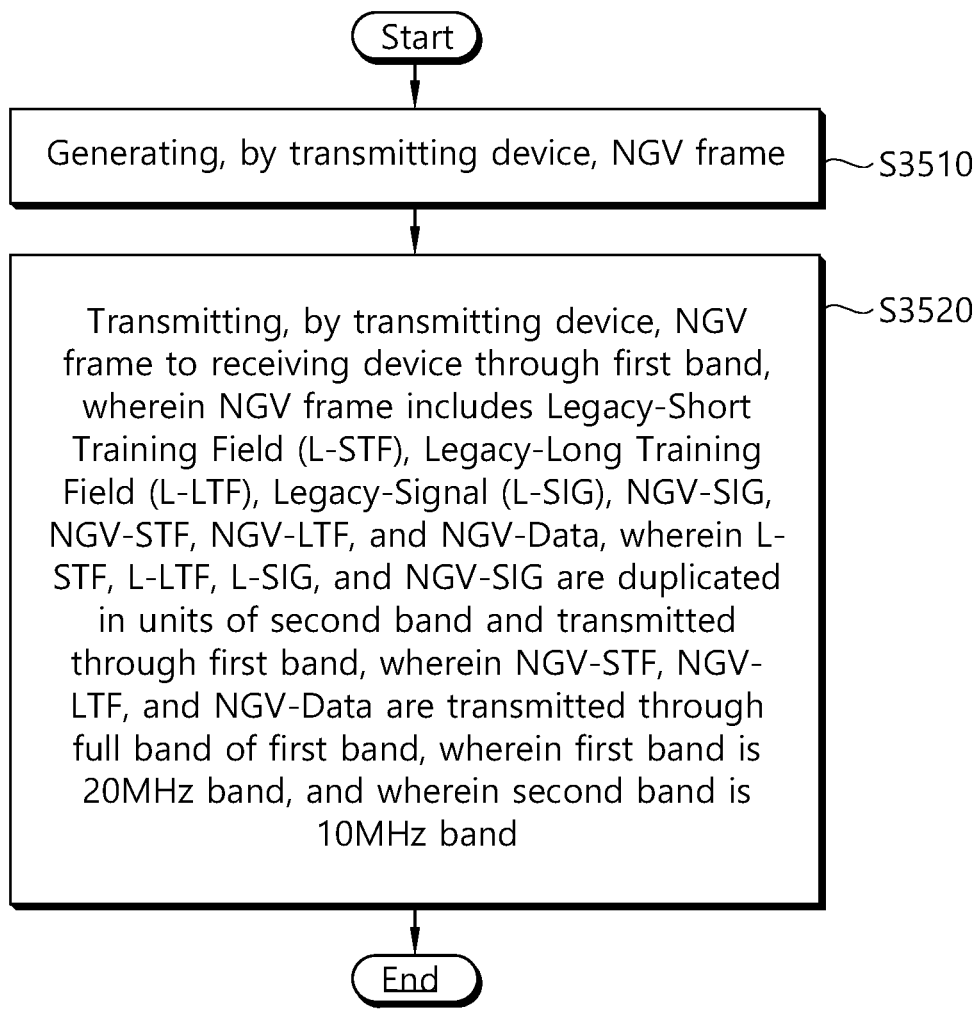
FIG. 35 is a flowchart showing a procedure for transmitting an NGV frame, by a transmitting device, according to the present embodiment.

FIG. 35 is a flowchart showing a procedure for transmitting an NGV frame, by a transmitting device, according to the present embodiment.

An example of FIG. 35 may be performed in a network environment being supported by a next generation wireless LAN system. The next generation wireless LAN system is an enhanced version of the 802.11p system, which can satisfy backward compatibility with the 802.11p system. The next generation wireless LAN system may also be referred to as a Next Generation V2X (NGV) wireless LAN system or an 802.11bd wireless LAN system.

The example of FIG. 35 is performed by a transmitting device, and the transmitting device may correspond to an AP. A receiving device of this embodiment may correspond to an NGV STA supporting an NGV or 802.11bd system or may correspond to an 11p STA supporting an 802.11p system.

This embodiment proposes a method for configuring an NGV frame for transmitting an NGV signal through a wide band (20 MHz or wider) while satisfying interoperability, backward compatibility or coexistence between/of the NGV or 802.11bd wireless LAN system and the 802.11p system, which is a legacy system.

In step S3510, the transmitting device generates the New Generation Vehicular (NGV) frame.

In step S3520, the transmitting device transmits the NGV frame through the first band.

The NGV frame includes Legacy-Short Training Field (L-STF), Legacy-Long Training Field (L-LTF), Legacy-Signal (L-SIG), Repeated Legacy (RL)-SIG, NGV-SIG, NGV-STF, NGV-LTF, and NGV-Data.

The L-STF, the L-LTF, the L-SIG, the RL-SIG, and the NGV-SIG are duplicated in units of a second band and transmitted through the first band. The first band is a 20 MHz band, and the second band is a 10 MHz band. That is, the L-STF, the L-LTF, the L-SIG, the RL-SIG, and the NGV-SIG may be configured in 10 MHz band (or channel) units, and, in order to be transmitted at a 20 MHz band, the frames (legacy part and NGV-SIG) being transmitted at a 10 MHz band may be duplicated once and then transmitted.

Conversely, the NGV-STF, the NGV-LTF, and the NGV-Data are transmitted through a full band of the first band. That is, the NGV-STF, the NGV-LTF, and the NGV-Data, which are remaining fields excluding the previously duplicated fields, may be transmitted by using all of the entire 20 MHz band (first band).

Additionally, the NGV frame may include a legacy part, the NGV-SIG, and an NGV part. At this point, the legacy part may include the L-STF, the L-LTF, the L-SIG, and the RL-SIG. The NGV part may include the NGV-STF, the NGV-LTF, and the NGV-Data.

The legacy part and the NGV-SIG may be generated by performing 2× DownClocking (DC) on a frame format for a 20 MHz band defined in an 802.11a system.

The NGV part may be generated by performing 2×DownClocking (DC) on a frame format for a 40 MHz band defined in the 802.11ac system. Alternatively, the NGV part may be generated without performing DC on a frame format for a 20 MHz band defined in the 802.11ac system. Alternatively, the NGV part may be generated by performing 4× DC on a frame format for an 80 MHz band defined in the 802.11ac system.

The NGV part may have an Orthogonal Frequency Division Multiplexing (OFDM) numerology having a same symbol length as the legacy part, or may have an OFDM numerology having a symbol length 2 times longer than the legacy part. If the NGV part has an OFDM numerology having the same symbol length as the legacy part, tone spacing of the NGV part may be equal to 156.26 kHz. And, if the NGV part has an OFDM numerology having a symbol length 2 times longer than the legacy part, tone spacing of the NGV part may be equal to 78.125 kHz.

Automatic Gain Control (AGC) estimation information of the NGV part may be obtained based on AGC estimation information that is obtained based on the L-STF. Accordingly, since there is no need to perform a separate AGC estimation process for the NGV part, the NGV-STF may not be included in the NGV part.

Channel estimation information of the NGV part may be obtained based on channel estimation information that is obtained based on the L-LTF. Accordingly, since there is no need to perform a separate channel estimation process for the NGV part, the NGV-LTF may not be included in the NGV part.

The RL-SIG may be used for extending a signal range and for performing packet classification. Additionally, as a signal field repeating L-SIG between the L-SIG and the NGV-SIG, the RL-SIG may also be used for enhancing reliability of the L-SIG.

The packet classification information may be information classifying a legacy frame and the NGV frame. As the RL-SIG is transmitted (or as the L-SIG is repeated and then transmitted), a range of an NGV signal may be extended.

The RL-SIG or the NGV-SIG may be modulated based on Quadrature-Binary Phase Shift Keying (Q-BPSK). By modulating the RL-SIG or the NGV-SIG based on Q-BPSK, an NGV (or 802.11bd) device may perform packet classification, which differentiates the legacy frame and the NGV frame.

An extra tone may be added to the L-SIG and the RL-SIG. The extra tone may be used for performing channel estimation of the legacy part and the NGV part.

Tone indexes of the extra tone may be −28, −27, 27, 28. In the 802.11p system, since the range of an OFDM subcarrier is from −26 to 26, indexes of the added extra tone may be −28, −27, 27, 28. Since the L-SIG and the RL-SIG are duplicated once in 10 MHz band units, for example, the extra tone may be added for an upper 10 MHz band, and the extra tone may be added for a lower 10 MHz band (herein, tone indexes of the extra tone being added to each of the upper 10 MHz band and the lower 10 MHz band are −28, −27, 27, 28). As another example, an extra tone having tone indexes of 27, 28, 29, 30 may be added for the upper 10 MHz band, and an extra tone having tone indexes of −30, −29, −28, −27 may be added for the lower 10 MHz band.

The receiving device may include a legacy STA supporting the 802.11p system or an NGV STA supporting the 802.11bd system.

In case the receiving device is a legacy STA supporting the 802.11p system, the receiving device (legacy STA) may decode even the legacy part, and by decoding the RL-SIG, the receiving device may verify that the corresponding frame is not its frame (or PPDU) and may stop the decoding process.

In case the receiving device is an NGV STA supporting the 802.11bd system, the receiving device may decode the legacy part and the NGV-SIG so as to know control information that is needed for the NGV part, and, then, the receiving device may receive the NGV frame through a 20 MHz band.

Additionally, the NGV-SIG may further include information on Modulation and Coding Scheme (MCS), Number of Spatial Time Streams (NSTS), Transmission Opportunity (TXOP), Dual Carrier Modulation (DCM), midamble, doppler, Space Time Block Coding (STBC), coding, bandwidth, Basic Service Set (BSS) color, BSS identifier, reception identifier, packet length, signal ranging, Low Density Parity Check (LDPC) additional (or extra) symbol, Cyclical Redundancy Check (CRC), and tail bit.

The information on bandwidth may include information on 10 MHz or 20 MHz bands being supported by the wireless LAN system. The information on MCS may include information up to 256 QAM being supported by the wireless LAN system. The information on coding may include information on Binary Convolutional Codes (BCC) or LDPC being supported by the wireless LAN system.

Figure 36:
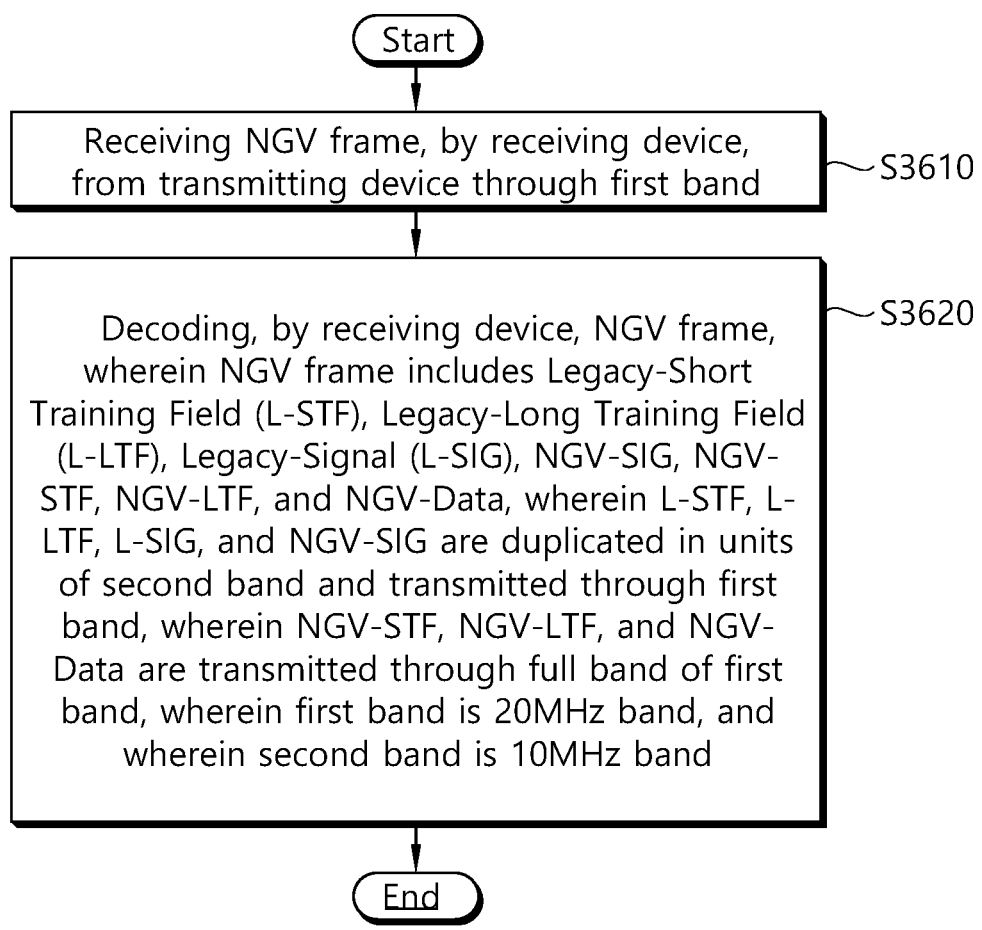
FIG. 36 is a flowchart showing a procedure for receiving an NGV frame, by a receiving device, according to the present embodiment.

FIG. 36 is a flowchart showing a procedure for receiving an NGV frame, by a receiving device, according to the present embodiment.

An example of FIG. 36 may be performed in a network environment being supported by a next generation wireless LAN system. The next generation wireless LAN system is an enhanced version of the 802.11p system, which can satisfy backward compatibility with the 802.11p system. The next generation wireless LAN system may also be referred to as a Next Generation V2X (NGV) wireless LAN system or an 802.11bd wireless LAN system.

The example of FIG. 36 is performed by a receiving device, and the receiving device may correspond to an NGV STA supporting an NGV or 802.11bd system or may correspond to an 11p STA supporting an 802.11p wireless LAN system. A transmitting device of FIG. 36 may correspond to an AP.

This embodiment proposes a method for configuring an NGV frame for transmitting an NGV signal through a wide band (20 MHz or wider) while satisfying interoperability, backward compatibility or coexistence between/of the NGV or 802.11bd wireless LAN system and the 802.11p system, which is a legacy system.

In step S3610, a receiving device receives the New Generation Vehicular (NGV) frame from a transmitting device through a first band.

In step S3620, the receiving device decodes the received NGV frame.

The NGV frame includes Legacy-Short Training Field (L-STF), Legacy-Long Training Field (L-LTF), Legacy-Signal (L-SIG), Repeated Legacy (RL)-SIG, NGV-SIG, NGV-STF, NGV-LTF, and NGV-Data.

The L-STF, the L-LTF, the L-SIG, the RL-SIG, and the NGV-SIG are duplicated in units of a second band and transmitted through the first band. The first band is a 20 MHz band, and the second band is a 10 MHz band. That is, the L-STF, the L-LTF, the L-SIG, the RL-SIG, and the NGV-SIG may be configured in 10 MHz band (or channel) units, and, in order to be transmitted at a 20 MHz band, the frames (legacy part and NGV-SIG) being transmitted at a 10 MHz band may be duplicated once and then transmitted.

Conversely, the NGV-STF, the NGV-LTF, and the NGV-Data are transmitted through a full band of the first band. That is, the NGV-STF, the NGV-LTF, and the NGV-Data, which are remaining fields excluding the previously duplicated fields, may be transmitted by using all of the entire 20 MHz band (first band).

Additionally, the NGV frame may include a legacy part, the NGV-SIG, and an NGV part. At this point, the legacy part may include the L-STF, the L-LTF, the L-SIG, and the RL-SIG. The NGV part may include the NGV-STF, the NGV-LTF, and the NGV-Data.

The legacy part and the NGV-SIG may be generated by performing 2× DownClocking (DC) on a frame format for a 20 MHz band defined in an 802.11a system.

The NGV part may be generated by performing 2× DownClocking (DC) on a frame format for a 40 MHz band defined in the 802.11ac system. Alternatively, the NGV part may be generated without performing DC on a frame format for a 20 MHz band defined in the 802.11ac system. Alternatively, the NGV part may be generated by performing 4× DC on a frame format for an 80 MHz band defined in the 802.11ac system.

The NGV part may have an Orthogonal Frequency Division Multiplexing (OFDM) numerology having a same symbol length as the legacy part, or may have an OFDM numerology having a symbol length 2 times longer than the legacy part. If the NGV part has an OFDM numerology having the same symbol length as the legacy part, tone spacing of the NGV part may be equal to 156.26 kHz. And, if the NGV part has an OFDM numerology having a symbol length 2 times longer than the legacy part, tone spacing of the NGV part may be equal to 78.125 kHz.

Automatic Gain Control (AGC) estimation information of the NGV part may be obtained based on AGC estimation information that is obtained based on the L-STF. Accordingly, since there is no need to perform a separate AGC estimation process for the NGV part, the NGV-STF may not be included in the NGV part.

Channel estimation information of the NGV part may be obtained based on channel estimation information that is obtained based on the L-LTF. Accordingly, since there is no need to perform a separate channel estimation process for the NGV part, the NGV-LTF may not be included in the NGV part.

The RL-SIG may be used for extending a signal range and for performing packet classification. Additionally, as a signal field repeating L-SIG between the L-SIG and the NGV-SIG, the RL-SIG may also be used for enhancing reliability of the L-SIG.

The packet classification information may be information classifying a legacy frame and the NGV frame. As the RL-SIG is transmitted (or as the L-SIG is repeated and then transmitted), a range of an NGV signal may be extended.

The RL-SIG or the NGV-SIG may be modulated based on Quadrature-Binary Phase Shift Keying (Q-BPSK). By modulating the RL-SIG or the NGV-SIG based on Q-BPSK, an NGV (or 802.11bd) device may perform packet classification, which differentiates the legacy frame and the NGV frame.

An extra tone may be added to the L-SIG and the RL-SIG. The extra tone may be used for performing channel estimation of the legacy part and the NGV part.

Tone indexes of the extra tone may be −28, −27, 27, 28. In the 802.11p system, since the range of an OFDM subcarrier is from −26 to 26, indexes of the added extra tone may be −28, −27, 27, 28. Since the L-SIG and the RL-SIG are duplicated once in 10 MHz band units, for example, the extra tone may be added for an upper 10 MHz band, and the extra tone may be added for a lower 10 MHz band (herein, tone indexes of the extra tone being added to each of the upper 10 MHz band and the lower 10 MHz band are −28, −27, 27, 28). As another example, an extra tone having tone indexes of 27, 28, 29, 30 may be added for the upper 10 MHz band, and an extra tone having tone indexes of −30, −29, −28, −27 may be added for the lower 10 MHz band.

The receiving device may include a legacy STA supporting the 802.11p system or an NGV STA supporting the 802.11bd system.

In case the receiving device is a legacy STA supporting the 802.11p system, the receiving device (legacy STA) may decode even the legacy part, and by decoding the RL-SIG, the receiving device may verify that the corresponding frame is not its frame (or PPDU) and may stop the decoding process.

In case the receiving device is an NGV STA supporting the 802.11bd system, the receiving device may decode the legacy part and the NGV-SIG so as to know control information that is needed for the NGV part, and, then, the receiving device may receive the NGV frame through a 20 MHz band.

Additionally, the NGV-SIG may further include information on Modulation and Coding Scheme (MCS), Number of Spatial Time Streams (NSTS), Transmission Opportunity (TXOP), Dual Carrier Modulation (DCM), midamble, doppler, Space Time Block Coding (STBC), coding, bandwidth, Basic Service Set (BSS) color, BSS identifier, reception identifier, packet length, signal ranging, Low Density Parity Check (LDPC) additional (or extra) symbol, Cyclical Redundancy Check (CRC), and tail bit.

The information on bandwidth may include information on 10 MHz or 20 MHz bands being supported by the wireless LAN system. The information on MCS may include information up to 256 QAM being supported by the wireless LAN system. The information on coding may include information on Binary Convolutional Codes (BCC) or LDPC being supported by the wireless LAN system.

7. Device Configuration

Figure 37:
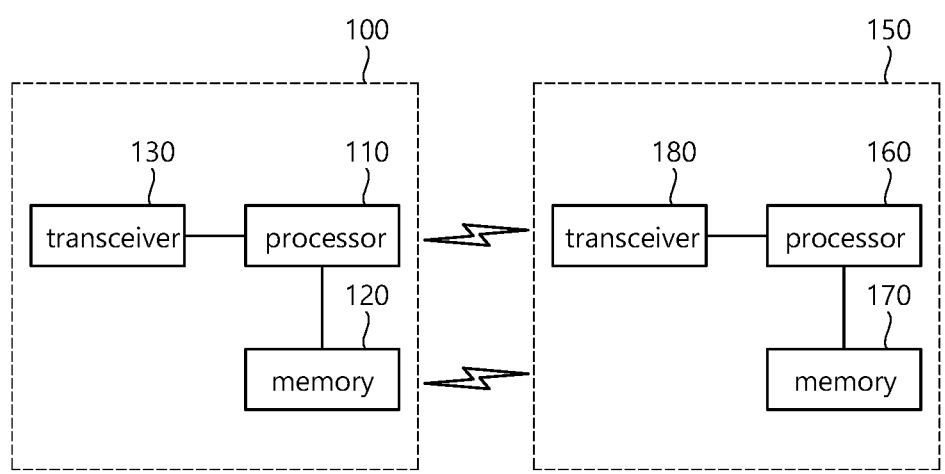
FIG. 37 is a diagram for describing a device for implementing the above-described method.

FIG. 37 is a diagram for describing a device for implementing the above-described method.

A wireless device (100) of FIG. 37 is a transmitting device that can implement the above-described embodiment and may be operated as an AP STA. A wireless device (150) of FIG. 37 is a receiving device that can implement the above-described embodiment and may be operated as a non-AP STA.

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement the functions, processes and/or methods proposed in the present disclosure. For example, the processor (110, 160) may perform the operation according to the present embodiment.

Operations of a processor (110) of the transmitting device will be described in detail as follows. The processor (110) of the transmitting device generates an NGV frame and transmits the NGV frame through the first band.

Operations of a processor (160) of the receiving device will be described in detail as follows. The processor (160) of the receiving device receives an NGV frame from the transmitting device through a first band and decodes the received NGV frame.

Figure 38:
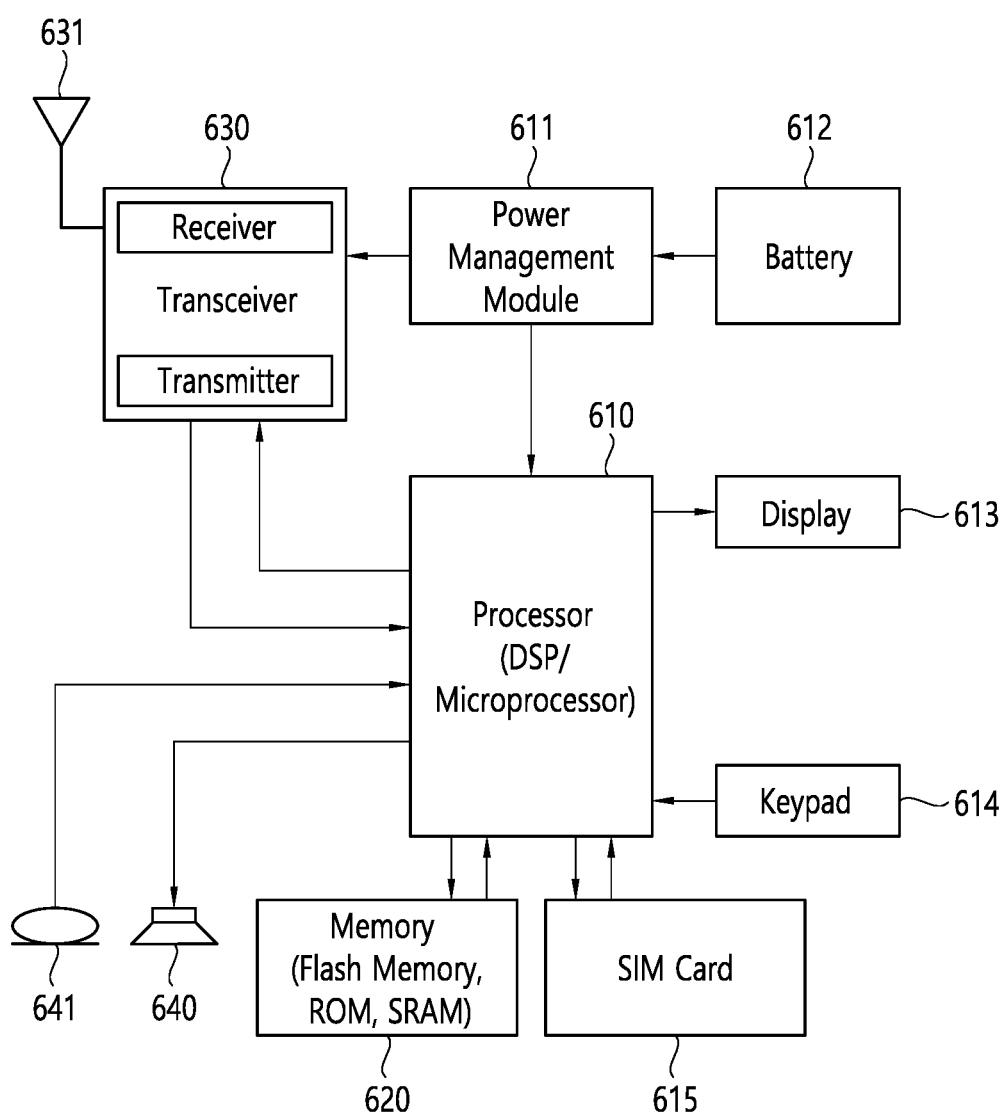
FIG. 38 illustrates a more detailed wireless device for implementing the embodiment of the present disclosure.

FIG. 38 shows a UE to which the technical features of the present disclosure can be applied.

A UE includes a processor (610), a power management module (611), a battery (612), a display (613), a keypad (614), a subscriber identification module (SIM) card (615), a memory (620), a transceiver (630), one or more antennas (631), a speaker (640), and a microphone (641).

The processor (610) may be configured to implement proposed functions, procedures and/or methods of the present disclosure described below. The processor (610) may be configured to control one or more other components of the UE (600) to implement proposed functions, procedures and/or methods of the present disclosure described below. Layers of the radio interface protocol may be implemented in the processor (610). The processor (610) may include application-specific integrated circuit (ASIC), other chipset, logic circuit and/or data processing device. The processor (610) may be an application processor (AP). The processor (610) may include at least one of a digital signal processor (DSP), a central processing unit (CPU), a graphics processing unit (GPU), a modem (modulator and demodulator). An example of the processor (610) may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The power management module (611) manages power for the processor (610) and/or the transceiver (630). The battery (612) supplies power to the power management module (611). The display (613) outputs results processed by the processor (610). The keypad (614) receives inputs to be used by the processor (610). The keypad (614) may be shown on the display (613). The SIM card (615) is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory (620) is operatively coupled with the processor (610) and stores a variety of information to operate the processor (610). The memory (620) may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory (620) and executed by the processor (610). The memory (620) can be implemented within the processor (610) or external to the processor (610) in which case those can be communicatively coupled to the processor (610) via various means as is known in the art.

The transceiver (630) is operatively coupled with the processor (610), and transmits and/or receives a radio signal. The transceiver (630) includes a transmitter and a receiver. The transceiver (630) may include baseband circuitry to process radio frequency signals. The transceiver (630) controls the one or more antennas (631) to transmit and/or receive a radio signal.

The speaker (640) outputs sound-related results processed by the processor (610). The microphone (641) receives sound-related inputs to be used by the processor (610).

In case of a transmitting device, the processor (610) generates an NGV frame and transmits the NGV frame through the first band.

In case of a receiving device, the processor (610) receives an NGV frame from the transmitting device through a first band and decodes the received NGV frame.

The NGV frame includes Legacy-Short Training Field (L-STF), Legacy-Long Training Field (L-LTF), Legacy-Signal (L-SIG), Repeated Legacy (RL)-SIG, NGV-SIG, NGV-STF, NGV-LTF, and NGV-Data.

The L-STF, the L-LTF, the L-SIG, the RL-SIG, and the NGV-SIG are duplicated in units of a second band and transmitted through the first band. The first band is a 20 MHz band, and the second band is a 10 MHz band. That is, the L-STF, the L-LTF, the L-SIG, the RL-SIG, and the NGV-SIG may be configured in 10 MHz band (or channel) units, and, in order to be transmitted at a 20 MHz band, the frames (legacy part and NGV-SIG) being transmitted at a 10 MHz band may be duplicated once and then transmitted.

Conversely, the NGV-STF, the NGV-LTF, and the NGV-Data are transmitted through a full band of the first band.

That is, the NGV-STF, the NGV-LTF, and the NGV-Data, which are remaining fields excluding the previously duplicated fields, may be transmitted by using all of the entire 20 MHz band (first band).

Additionally, the NGV frame may include a legacy part, the NGV-SIG, and an NGV part. At this point, the legacy part may include the L-STF, the L-LTF, the L-SIG, and the RL-SIG. The NGV part may include the NGV-STF, the NGV-LTF, and the NGV-Data.

The legacy part and the NGV-SIG may be generated by performing 2×DownClocking (DC) on a frame format for a 20 MHz band defined in an 802.11a system.

The NGV part may be generated by performing 2× DownClocking (DC) on a frame format for a 40 MHz band defined in the 802.11ac system. Alternatively, the NGV part may be generated without performing DC on a frame format for a 20 MHz band defined in the 802.11ac system. Alternatively, the NGV part may be generated by performing 4× DC on a frame format for an 80 MHz band defined in the 802.11ac system.

The NGV part may have an Orthogonal Frequency Division Multiplexing (OFDM) numerology having a same symbol length as the legacy part, or may have an OFDM numerology having a symbol length 2 times longer than the legacy part. If the NGV part has an OFDM numerology having the same symbol length as the legacy part, tone spacing of the NGV part may be equal to 156.26 kHz. And, if the NGV part has an OFDM numerology having a symbol length 2 times longer than the legacy part, tone spacing of the NGV part may be equal to 78.125 kHz.

Automatic Gain Control (AGC) estimation information of the NGV part may be obtained based on AGC estimation information that is obtained based on the L-STF. Accordingly, since there is no need to perform a separate AGC estimation process for the NGV part, the NGV-STF may not be included in the NGV part.

Channel estimation information of the NGV part may be obtained based on channel estimation information that is obtained based on the L-LTF. Accordingly, since there is no need to perform a separate channel estimation process for the NGV part, the NGV-LTF may not be included in the NGV part.

The RL-SIG may be used for extending a signal range and for performing packet classification. Additionally, as a signal field repeating L-SIG between the L-SIG and the NGV-SIG, the RL-SIG may also be used for enhancing reliability of the L-SIG.

The packet classification information may be information classifying a legacy frame and the NGV frame. As the RL-SIG is transmitted (or as the L-SIG is repeated and then transmitted), a range of an NGV signal may be extended.

The RL-SIG or the NGV-SIG may be modulated based on Quadrature-Binary Phase Shift Keying (Q-BPSK). By modulating the RL-SIG or the NGV-SIG based on Q-BPSK, an NGV (or 802.11bd) device may perform packet classification, which differentiates the legacy frame and the NGV frame.

An extra tone may be added to the L-SIG and the RL-SIG. The extra tone may be used for performing channel estimation of the legacy part and the NGV part.

Tone indexes of the extra tone may be −28, −27, 27, 28. In the 802.11p system, since the range of an OFDM subcarrier is from −26 to 26, indexes of the added extra tone may be −28, −27, 27, 28. Since the L-SIG and the RL-SIG are duplicated once in 10 MHz band units, for example, the extra tone may be added for an upper 10 MHz band, and the extra tone may be added for a lower 10 MHz band (herein, tone indexes of the extra tone being added to each of the upper 10 MHz band and the lower 10 MHz band are −28, −27, 27, 28). As another example, an extra tone having tone indexes of 27, 28, 29, 30 may be added for the upper 10 MHz band, and an extra tone having tone indexes of −30, −29, −28, −27 may be added for the lower 10 MHz band.

The receiving device may include a legacy STA supporting the 802.11p system or an NGV STA supporting the 802.11bd system.

In case the receiving device is a legacy STA supporting the 802.11p system, the receiving device (legacy STA) may decode even the legacy part, and by decoding the RL-SIG, the receiving device may verify that the corresponding frame is not its frame (or PPDU) and may stop the decoding process.

In case the receiving device is an NGV STA supporting the 802.11bd system, the receiving device may decode the legacy part and the NGV-SIG so as to know control information that is needed for the NGV part, and, then, the receiving device may receive the NGV frame through a 20 MHz band.

Additionally, the NGV-SIG may further include information on Modulation and Coding Scheme (MCS), Number of Spatial Time Streams (NSTS), Transmission Opportunity (TXOP), Dual Carrier Modulation (DCM), midamble, doppler, Space Time Block Coding (STBC), coding, bandwidth, Basic Service Set (BSS) color, BSS identifier, reception identifier, packet length, signal ranging, Low Density Parity Check (LDPC) additional (or extra) symbol, Cyclical Redundancy Check (CRC), and tail bit.

The information on bandwidth may include information on 10 MHz or 20 MHz bands being supported by the wireless LAN system. The information on MCS may include information up to 256 QAM being supported by the wireless LAN system. The information on coding may include information on Binary Convolutional Codes (BCC) or LDPC being supported by the wireless LAN system.

What is claimed is:

1. A method for transmitting a New Generation Vehicular (NGV) frame in a wireless local area network (WLAN) system, the method comprising:
    generating, by a transmitting device, the NGV frame; and
    transmitting, by the transmitting device, the NGV frame to a receiving device through a first band,
    wherein the NGV frame includes Legacy-Short Training Field (L-STF), Legacy-Long Training Field (L-LTF), Legacy-Signal (L-SIG), Repeated Legacy (RL)-SIG, NGV-SIG, NGV-STF, NGV-LTF, and NGV-Data,
    wherein the L-SIG, the RL-SIG and the NGV-SIG are duplicated in units of a second band and transmitted through the first band,
    wherein the NGV-STF and the NGV-LTF are transmitted through a full band of the first band,
    wherein a subcarrier frequency spacing of the NGV-STF, the NGV-LTF and the NGV-Data is half of a subcarrier frequency spacing of a Very High Throughput (VHT) physical (PHY),
    wherein the first band is a 20 MHz band, and
    wherein the second band is a 10 MHz band.

2. The method of claim 1,
    wherein the NGV frame includes a legacy part, the NGV-SIG, and an NGV part,
    wherein the legacy part includes the L-STF, the L-LTF, the L-SIG, and the RL-SIG,
    wherein the NGV part includes the NGV-STF, the NGV-LTF, and the NGV-Data, wherein the legacy part and the NGV-SIG are generated by performing 2× DownClocking (DC) on a frame format for a 20 MHz band defined in a first WLAN system, wherein the NGV part is generated by performing 2× DownClocking (DC) on a frame format for a 40 MHz band defined in a second WLAN system, wherein the first WLAN system supports an 802.11a PHY, and wherein the second WLAN system supports the VHT PHY.

3. The method of claim 2, wherein the NGV part has an Orthogonal Frequency Division Multiplexing (OFDM) numerology having a same symbol length as the legacy part, or has an OFDM numerology having a symbol length 2 times longer than the legacy part.

4. The method of claim 2, wherein Automatic Gain Control (AGC) estimation information of the NGV part is obtained based on AGC estimation information being obtained based on the L-STF, and wherein channel estimation information of the NGV part is obtained based on channel estimation information being obtained based on the L-LTF.

5. The method of claim 2, wherein the RL-SIG is used for extending a signal range and for performing packet classification, and wherein the packet classification information is information classifying a legacy frame and the NGV frame.

6. The method of claim 2, wherein the RL-SIG or the NGV-SIG is modulated based on Quadrature-Binary Phase Shift Keying (Q-BPSK).

7. The method of claim 2, wherein an extra tone is added to the L-SIG and the RL-SIG, wherein the extra tone is used for performing channel estimation of the legacy part and the NGV part, and wherein tone indexes of the extra tone are −28, −27, 27, 28.

8. A transmitting device for transmitting a New Generation Vehicular (NGV) frame in a wireless local area network (WLAN) system, the transmitting device comprising:
a memory;
a transceiver; and
a processor being operatively connected to the memory and the transceiver,
wherein the processor is configured to:
generate the NGV frame, and
transmit the NGV frame to a receiving device through a first band,
wherein the NGV frame includes Legacy-Short Training Field (L-STF), Legacy-Long Training Field (L-LTF), Legacy-Signal (L-SIG), Repeated Legacy (RL)-SIG, NGV-SIG, NGV-STF, NGV-LTF, and NGV-Data,
wherein the L-SIG, the RL-SIG and the NGV-SIG are duplicated in units of a second band and transmitted through the first band,
wherein the NGV-STF and the NGV-LTF are transmitted through a full band of the first band,
wherein a subcarrier frequency spacing of the NGV-STF, the NGV-LTF and the NGV-Data is half of a subcarrier frequency spacing of a Very High Throughput (VHT) physical (PHY),
wherein the first band is a 20 MHz band, and
wherein the second band is a 10 MHz band.

9. The transmitting device of claim 8, wherein the NGV frame further includes Repeated Legacy (RL)-SIG,
wherein the RL-SIG is duplicated in units of the second band and transmitted through the first band,
wherein the NGV frame includes a legacy part, the NGV-SIG, and an NGV part,
wherein the legacy part includes the L-STF, the L-LTF, the L-SIG, and the RL-SIG,
wherein the NGV part includes the NGV-STF, the NGV-LTF, and the NGV-Data,
wherein the legacy part and the NGV-SIG are generated by performing 2× DownClocking (DC) on a frame format for a 20 MHz band defined in a first WLAN system,
wherein the NGV part is generated by performing 2× DownClocking (DC) on a frame format for a 40 MHz band defined in a second WLAN system,
wherein the first WLAN system supports an 802.11a PHY, and
wherein the second WLAN system supports the VHT PHY.

10. The transmitting device of claim 9, wherein the NGV part has an Orthogonal Frequency Division Multiplexing (OFDM) numerology having a same symbol length as the legacy part, or has an OFDM numerology having a symbol length 2 times longer than the legacy part.

11. The transmitting device of claim 9, wherein Automatic Gain Control (AGC) estimation information of the NGV part is obtained based on AGC estimation information being obtained based on the L-STF, and
wherein channel estimation information of the NGV part is obtained based on channel estimation information being obtained based on the L-LTF.

12. The transmitting device of claim 9, wherein the RL-SIG is used for extending a signal range and for performing packet classification, and
wherein the packet classification information is information classifying a legacy frame and the NGV frame.

13. The transmitting device of claim 9, wherein the RL-SIG or the NGV-SIG is modulated based on Quadrature-Binary Phase Shift Keying (Q-BPSK).

14. The transmitting device of claim 9, wherein an extra tone is added to the L-SIG and the RL-SIG,
wherein the extra tone is used for performing channel estimation of the legacy part and the NGV part, and
wherein tone indexes of the extra tone are −28, −27, 27, 28.

15. A method for receiving a New Generation Vehicular (NGV) frame in a wireless local area network (WLAN) system, the method comprising:
receiving the NGV frame, by a receiving device, from a transmitting device through a first band; and
decoding, by the receiving device, the NGV frame,
wherein the NGV frame includes Legacy-Short Training Field (L-STF), Legacy-Long Training Field (L-LTF), Legacy-Signal (L-SIG), Repeated Legacy (RL)-SIG, NGV-SIG, NGV-STF, NGV-LTF, and NGV-Data,
wherein the L-SIG, the RL-SIG and the NGV-SIG are duplicated in units of a second band and transmitted through the first band,
wherein the NGV-STF and the NGV-LTF are transmitted through a full band of the first band,
wherein a subcarrier frequency spacing of the NGV-STF, the NGV-LTF and the NGV-Data is half of a subcarrier frequency spacing of a Very High Throughput (VHT) physical (PHY),
wherein the first band is a 20 MHz band, and
wherein the second band is a 10 MHz band.

* * * * *